United States Patent
Igarashi et al.

(10) Patent No.: US 12,116,545 B2
(45) Date of Patent: *Oct. 15, 2024

(54) LUBRICATING AGENT

(71) Applicant: KAO CORPORATION, Tokyo (JP)

(72) Inventors: Takako Igarashi, Wakayama (JP); Yuya Kitagawa, Wakayama (JP); Ryuuya Arata, Wakayama (JP)

(73) Assignee: KAO CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/007,770

(22) PCT Filed: Jul. 30, 2021

(86) PCT No.: PCT/JP2021/028329
§ 371 (c)(1),
(2) Date: Dec. 2, 2022

(87) PCT Pub. No.: WO2022/025245
PCT Pub. Date: Feb. 3, 2022

(65) Prior Publication Data
US 2023/0265354 A1    Aug. 24, 2023

(30) Foreign Application Priority Data

Jul. 30, 2020 (JP) .................... 2020-129246
Dec. 25, 2020 (JP) .................... 2020-217304

(51) Int. Cl.
| | | |
|---|---|---|
| C10M 135/10 | (2006.01) | |
| C09K 3/32 | (2006.01) | |
| C10M 105/72 | (2006.01) | |
| C10M 173/02 | (2006.01) | |
| D06M 13/256 | (2006.01) | |
| C10N 20/00 | (2006.01) | |

(52) U.S. Cl.
CPC ............ C10M 135/10 (2013.01); C09K 3/32 (2013.01); C10M 105/72 (2013.01); C10M 173/02 (2013.01); D06M 13/256 (2013.01); C10M 2219/044 (2013.01); C10N 2020/091 (2020.05)

(58) Field of Classification Search
CPC ............ C10N 2030/26; C10N 2040/46; C10N 2020/091; C10N 2010/02; C10M 135/10; C10M 105/72; C10M 173/02; C10M 2201/02; C10M 2207/04; C10M 2219/044; C10M 2215/02; C10M 2209/104; C10M 2219/042; C10M 2215/224; C10M 2221/04; C10M 2209/103; C10M 2209/108; C09K 3/32; D06M 13/2246; D06M 13/256; D06M 2200/12; D06M 2200/40
See application file for complete search history.

(56) References Cited

U.S. PATENT DOCUMENTS

| | | | |
|---|---|---|---|
| 4,443,355 A * | 4/1984 | Murata | G03F 7/70216 510/323 |
| 5,419,842 A | 5/1995 | Crutzen | |
| 2007/0214999 A1 | 9/2007 | Meyer et al. | |
| 2012/0291669 A1* | 11/2012 | Busch | C07C 309/17 106/287.24 |
| 2013/0203825 A1 | 8/2013 | Premachandran et al. | |
| 2017/0015842 A1 | 1/2017 | Hozumi et al. | |
| 2018/0051201 A1 | 2/2018 | Vanzin et al. | |
| 2022/0243089 A1 | 8/2022 | Matsuzaki et al. | |

FOREIGN PATENT DOCUMENTS

| | | |
|---|---|---|
| CN | 103833613 A | 6/2014 |
| CN | 109072129 A | 12/2018 |
| CN | 109790450 A | 5/2019 |
| EP | 4079960 A1 | 10/2022 |
| JP | 2000026758 A | 1/2000 |
| JP | 2005171399 A | 6/2005 |
| JP | 2005343948 A | 12/2005 |
| JP | 2007222910 A | 9/2007 |
| JP | 2010159351 A | 7/2010 |

(Continued)

OTHER PUBLICATIONS

International Search Report issued Sep. 28, 2021 in PCT/JP2021/028329 (with English translation), 6 pages.

English translation of the International Preliminary Report on Patentability and Written Opinion issued Feb. 9, 2023 in PCT/JP2021/028329, 7 pages.

"Synthesis and surface activity determination of sodium salt of bis-2-butyloctyl sulfosuccinate", Advances in Fine Petrochemicals, 2006, pp. 4-6 (copy not available, submitting summary only, with English translation).

Combined Chinese Office Action and Search Report issued Jun. 12, 2023 in Patent Application No. 202180042955.1 (with English translation), 15 pages.

(Continued)

Primary Examiner — Vishal V Vasisth
(74) Attorney, Agent, or Firm — Element IP, PLC

(57) ABSTRACT

The present invention is a lubricating agent containing a compound represented by the following formula 1:

Formula 1

$$MO_3S\text{—}\overset{\displaystyle O}{\underset{\displaystyle O}{\begin{array}{c}\|\\\text{—}\end{array}}}\text{—}O\text{—}(A^1O)_{x1}\text{—}R^1$$
$$\phantom{MO_3S\text{—}}O\text{—}(A^2O)_{x2}\text{—}R^2$$

wherein $R^1$ and $R^2$ each represent a hydrocarbon group with 6 or more and 24 or less carbons; $A^1O$ and $A^2O$ each represent an alkyleneoxy group with 2 or more and 4 or less carbons; $x1$ and $x2$ are average numbers of added moles, and each represent a number of 0 or more and 10 or less; and M is a cationic ion.

15 Claims, No Drawings

(56) References Cited

FOREIGN PATENT DOCUMENTS

| | | |
|---|---|---|
| JP | 2010202795 A | 9/2010 |
| JP | 2011190305 A | 9/2011 |
| JP | 2011196149 A | 10/2011 |
| JP | 2012067431 A | 4/2012 |
| JP | 2012172032 A | 9/2012 |
| JP | 2014185334 A | 10/2014 |
| JP | 2015120984 A | 7/2015 |
| JP | 2018031090 A | 3/2018 |
| JP | 2019218651 A | 12/2019 |
| JP | 2020200407 A | 12/2020 |
| WO | WO-2017204149 A1 | 11/2017 |

OTHER PUBLICATIONS

Li Yun-zhe, et al., "Catalytic synthesis of Guerbet alcohol and application of Guerbet derivatives", Detergent & Cosmetics, vol. 38, No. 6, Jun. 2015, pp. 29-32 (with English abstract).

Extended European Search Report issued Aug. 5, 2024 in corresponding European Patent Application No. 21849576.0, 9 pages.

* cited by examiner

LUBRICATING AGENT

This application is a 371 of PCT/JP2021/028329, filed Jul. 30, 2021.

FIELD OF THE INVENTION

The present invention relates to a lubricating agent, a lubricating agent composition and a method for treating a target object.

BACKGROUND OF THE INVENTION

As methods for modifying solid surfaces such as hard articles, textile products or the like, for example, water-repellent treatments and hydrophilic treatments are known. Water-repellent treatments are technologies for performing surface treatments that impart water-repellency to solid surfaces such as glass, metals, fibers or the like, thereby preventing dirt included in water from adhering thereto. On the other hand, hydrophilic treatments are technologies for reducing the contact angles of solid surfaces with water, thereby making the solid surfaces easily wetted with water. These treatments are known to contribute to, for example, the prevention of dirt adhesion, easy desorption of dirt or the like.

JP-A 2015-120984 discloses a textile product to which one or more antibacterial agents selected from a metal oxide, a pyridine-based compound and a cationic polymer and one or more compounds selected from a water absorbing agent, a nonionic softener and a cationic softener are imparted, wherein the textile product has a water absorbency of 40 seconds or less as measured by the dropping method in JIS L 1907 (2010) and a diffusive residual moisture content of 50% or less.

JP-A 2012-67431 discloses a method for modifying a fiber material comprising, treating the fiber material in a bath of an aqueous alkali solution comprising a fiber material modifying agent comprising a reaction product of a predetermined tertiary amine and epihalohydrin, and thereafter further treating the fiber material in a bath comprising one or more compounds selected from an anionic compound or an amphoteric compound.

JP-A 2020-200407 discloses a hydrophilization treatment agent comprising, under predetermined conditions, an aqueous resin dispersion (A) comprising an ethylene-vinyl alcohol copolymer (A1) and a radical polymer (A2) having a structural unit derived from a radically polymerizable carboxylic acid monomer (A2-1), as a resin solid content, crosslinkable fine particles (B) and a polyetheramine (C).

JP-A 2014-185334 discloses a method for producing a water/oil repellant coating film comprising, a step of producing a precursor solution by dissolving a specific organic silane compound in an organic solvent and a step of applying the precursor solution to the surface of a solid object.

SUMMARY OF THE INVENTION

Few agents are known that can efficiently impart lubricity against water to various target surfaces in a simple manner. When a surface is subjected to a water-repellent treatment, the surface is coated with a low surface energy substance terminated with an alkyl group or a perfluoroalkyl group, but this often requires chemical reactions and is difficult to effectively impart lubricity, for example, in such an aspect that the article is treated in water.

The present invention provides a lubricating agent capable of effectively imparting lubricity against water to various target surfaces (target objects).

The present invention relates to a lubricating agent containing (A) a compound represented by the following formula 1 [hereinafter referred to as component (A)]:

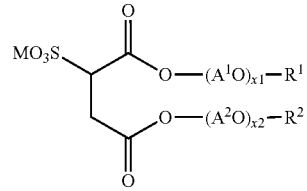

Formula 1 wherein $R_1$ and $R^2$ each represent a hydrocarbon group with 6 or more and 24 or less carbons; $A^1O$ and $A^2O$ each represent an alkyleneoxy group with 2 or more and 4 or less carbons; x1 and x2 are average numbers of added moles, and each represent a number of 0 or more and 10 or less; and M is a cationic ion.

Further, the present invention relates to a lubricating agent composition containing component (A).

Further, the present invention relates to a method for treating a target object including, adhering component (A) and water to the target object to form a liquid sliding surface against water on the target object.

According to the present invention, provided is a lubricating agent capable of effectively imparting lubricity against water to various target surfaces (target objects).

EMBODIMENTS OF THE INVENTION

[Lubricating Agent]

The present invention relates to a lubricating agent containing the compound represented by the formula 1.

The lubricating agent of the present invention is an agent capable of imparting lubricity against water to a target object, and contains the compound of component (A) as the active ingredient thereof.

The lubricating agent of the present invention may be composed of component (A). Further, it may contain one or more of component (A) or may be composed of one or more of component (A).

Component (A) is a sulfosuccinate with a specific structure having two hydrocarbon groups, and can impart excellent lubricity against water to a target object. The reason why this effect is exhibited is not certain, but is considered to be as follows. Component (A) is a sulfosuccinate having two hydrocarbon groups and thus is easy to take a large critical packing parameter (CPP), so that it can form a stable vesicle in water even in the presence of hardness components existing in water (e.g., $Ca^{2+}$), making it possible to form a wet lubricating film (wet lubricating layer) on the surface of a target object. Once the wet lubricating film is formed, water moves by sliding along this film to be drained away, which is different from conventional drainage by water diffusion and achieved by the above film serving as a lubricating surface. It is considered that the wet lubricating film has a strong tendency not to take in but exclude water from outside while being a water-bearing film. For example, when component (A) is applied to a textile product in water and the textile product is thereafter taken out of water, water is separated by sliding down from the gaps between the fibers under gravity, so that the desorption of water is promoted. In other words, the lubricating agent of the present invention is capable of separating water from a target object in liquid form. The reason why the sulfosuccinate of component (A) can impart excellent lubricity against water to a target object is inferred as described above.

$R^1$ and $R^2$ in the formula 1 may be the same or different, and each represent a hydrocarbon group with 6 or more and 24 or less carbons. Examples of the hydrocarbon group include an alkyl group and an alkenyl group.

The hydrocarbon groups of $R^1$ and $R^2$ in the formula 1 each have 6 or more, preferably 8 or more, more preferably 9 or more and further preferably 10 or more carbons from the viewpoint of lubricity against water, and 24 or less, preferably 20 or less, more preferably 17 or less and further preferably 12 or less carbons from the viewpoint of dispersibility in water.

The hydrocarbon groups of $R^1$ and $R^2$ in the formula 1 each have preferably 10 or more, and preferably 14 or less and more preferably 12 or less carbons from the viewpoints of lubricity against water, dewaterability and dispersibility in water. Here, the term "dewaterability" means dewaterability from a target object when water comes in contact with the target object after treatment with the lubricating agent of the present invention.

The total number of carbons in $R^1$ and $R^2$ in the formula 1 is preferably 18 or more and more preferably 20 or more from the viewpoint of lubricity against water, and preferably 30 or less, more preferably 28 or less, further preferably 26 or less, furthermore preferably 24 or less and furthermore preferably 22 or less from the same viewpoint. Here, when the lubricating agent of the present invention contains two or more compounds different in the total number of carbons in $R^1$ and $R^2$ as component (A), the total number of carbons in $R^1$ and $R^2$ in the lubricating agent represents the molar average of the total numbers of carbons in $R^1$ and $R^2$ in the compounds.

The hydrocarbon groups of $R^1$ and $R^2$ in the formula 1 may each be either a straight chain or a branched chain, but preferably include a branched chain from the viewpoint of dispersibility in water. When the hydrocarbon groups of $R^1$ and $R^2$ are branched chains, they each preferably have a side chain with 2 or more carbons and more preferably have a side chain with 3 or more carbons from the viewpoint of lubricity against water. The side chain may have 10 or less, further 8 or less and further 6 or less carbons. Note that, when in each of the hydrocarbon groups of $R^1$ and $R^2$, referring to the longest array of carbons as the main chain with the carbon bonded to the oxygen atom (O) in the formula taken as the first carbon, and taking the number of carbons in the main chain as X ($R^1$ and $R^2$ each have 6 or more carbons, so that X is 3 or more), a hydrocarbon group bonded to any of the first carbon to the X-1 carbon in the main chain is referred to as a side chain.

The hydrocarbon groups of $R^1$ and $R^2$ in the formula 1 may be either saturated or unsaturated, but when they are straight chains, they preferably include an unsaturated hydrocarbon group from the viewpoint of dispersibility in water.

Accordingly, it is preferable that at least one of $R^1$ and $R^2$ in the formula 1 be a hydrocarbon group having a branching structure or an unsaturated bond.

It is more preferable that the hydrocarbon groups of $R^1$ and $R^2$ in the formula 1 include a saturated branched-chain hydrocarbon group or an unsaturated straight-chain hydrocarbon group from the viewpoint of lubricity against water.

Further, when the hydrocarbon groups of $R^1$ and $R^2$ are branched-chain hydrocarbon groups, they may be a group derived from a Guerbet alcohol from the viewpoints of lubricity against water and availability.

Further, when the hydrocarbon groups of $R^1$ and $R^2$ are branched-chain hydrocarbon groups with 10 carbons, they may be a group derived from an alcohol with 10 carbons having a branched chain such as isodecanol (for example, a decyl alcohol manufactured by KH Neochem Co., Ltd.) or the like from the viewpoints of lubricity against water and availability.

The hydrocarbon groups of $R^1$ and $R^2$ in the formula 1 are each preferably a branched-chain hydrocarbon group and more preferably a saturated branched-chain hydrocarbon group from the viewpoint of lubricity against water.

Component (A) is preferably a compound of the formula 1 in which $R^1$ and $R^2$ each independently represent a branched-chain alkyl group with 10 or more and 12 or less carbons and further a branched-chain alkyl group with 10 carbons.

In the present invention, hydrocarbon residues excluding a hydroxy group from a secondary alcohol fall into an open-chain branched hydrocarbon group such as a branched-chain alkyl group or the like.

When $R^1$ and $R^2$ each represent a branched-chain alkyl group with 10 or more and 12 or less carbons, they may be the same or different in the total of the numbers of carbons constituting side chains, which is preferably 1 or more and more preferably 2 or more, and preferably 4 or less, more preferably 3 or less and further preferably 3 from the viewpoint of lubricity against water.

In the present invention, "the total of the numbers of carbons constituting side chains" refers to the total of the numbers of carbons in all the side chains other than the main chain in one branched-chain alkyl group, and when there is a plurality of side chains, it refers to the total of the numbers of carbons in all those side chains.

$R^1$ and $R^2$ may be the same or different in the number of side chains, which is 1 or more, and preferably 3 or less and more preferably 2 or less from the viewpoint of lubricity against water. The numbers of side chains in $R^1$ and $R^2$ are each preferably 1 from the viewpoint of lubricity against water.

In the present invention, "the number of side chains" refers to the number of side chains branched from the main chain, and even if the side chains further have side chains branched from the side chains, the number of side chains remains the same. However, although the side chains may further have side chains branched from the side chains, the side chains are preferably straight chains from the viewpoint of lubricity against water.

When $R^1$ and $R^2$ each independently represent a branched-chain alkyl group with 10 or more and 12 or less carbons, $R^1$ and $R^2$ may be the same or different in the number of branching carbons, which is 1 or more, and preferably 3 or less and furthermore preferably 2 or less from the viewpoint of lubricity against water. The numbers of branching carbons in $R^1$ and $R^2$ are each preferably 1 from the viewpoint of lubricity against water. In the present invention, "the number of branching carbons" refers to the total of the numbers of tertiary carbon atoms and quaternary carbon atoms in a branched-chain alkyl group.

More preferable aspects of $R^1$ and $R^2$ are branched-chain alkyl groups with 10 or more and 12 or less carbons, wherein in the branched-chain alkyl groups, the main chains each independently have 7 or 8 carbons, the numbers of carbons constituting side chains are each independently preferably 1 or more and 4 or less, more preferably 2 or more and 4 or less, further preferably 2 or more and 3 or less and furthermore 3, and the numbers of side chains are each independently preferably 3 or less, more preferably 2 or less and further preferably 1 from the viewpoint of lubricity against water.

$R^1$ and $R^2$ each represent preferably a branched-chain alkyl group selected from a branched-chain decyl group and a branched-chain dodecyl group and more preferably a branched-chain decyl group from the viewpoint of lubricity against water. Examples of the branched-chain decyl group include a 2-propylheptyl group, a group derived from a decyl alcohol manufactured by KH Neochem Co., Ltd. or the like, and a 2-propylheptyl group is preferable. Examples of the branched-chain dodecyl group include a 2-butyloctyl group or the like.

The hydrocarbon groups of $R^1$ and $R^2$ may each be a branched-chain hydrocarbon group with 10 or more and 12 or less carbons derived from a Guerbet alcohol.

The hydrocarbon groups of $R^1$ and $R^2$ in the formula 1 may be the same or different. The case where the hydrocarbon groups of $R^1$ and $R^2$ are different is preferable from the viewpoint of dispersibility in water. Further, the case where the hydrocarbon groups of $R^1$ and $R^2$ are the same is preferable from the viewpoint of lubricity against water. For example, the numbers of carbons in $R^1$ and $R^2$ in the formula 1 may be the same or different. The case where the numbers of carbons in $R^1$ and $R^2$ are different is preferable from the viewpoint of dispersibility in water. Further, the case where the numbers of carbons in $R^1$ and $R^2$ are the same is preferable from the viewpoint of lubricity against water.

When the hydrocarbon groups of $R^1$ and $R^2$ in the formula 1 include a branched chain, the degree of branching defined by the following formula is preferably 0.3 or less, more preferably 0.2 or less, further preferably 0.1 or less and furthermore preferably 0.08 or less from the viewpoint of lubricity against water, and preferably 0.01 or more, more preferably 0.02 or more and further preferably 0.04 or more from the viewpoint of lubricity against water.

Degree of branching=[(total number of terminal methyl groups in $R^1$ and $R^2$)−2]/(total number of carbons in $R^1$ and $R^2$)

Note that the degree of branching is an average value that can be measured with $^1$H-NMR.

The compound represented by the formula 1 of component (A) may be one or more compounds selected from a compound in which $R^1$ and $R^2$ represent hydrocarbon groups of the same structure and a compound in which $R^1$ and $R^2$ represent hydrocarbon groups of different structures.

Component (A) is preferably the compound in which $R^1$ and $R^2$ represent hydrocarbon groups of the same structure from the viewpoint of lubricity against water.

Component (A) is preferably the compound in which $R^1$ and $R^2$ represent hydrocarbon groups of different structures from the viewpoint of dispersibility in water.

For example, the lubricating agent of the present invention can contain the compound represented by the formula 1 in which $R^1$ and $R^2$ represent hydrocarbon groups of the same structure and the compound represented by the formula 1 in which $R^1$ and $R^2$ represent hydrocarbon groups of different structures.

$A^1O$ and $A^2O$ in the formula 1 each represent an alkyleneoxy group with 2 or more and 4 or less carbons and preferably 2 or 3 carbons from the viewpoint of lubricity against water. x1 and x2 in the formula 1 represent the average numbers of added moles of $A^1O$ and $A^2O$, respectively, and each represent a number of 0 or more and 10 or less, and preferably 6 or less, more preferably 4 or less, further preferably 2 or less and further preferably 0 from the viewpoint of lubricity against water.

M in the formula 1 is a cationic ion. M is preferably a cationic ion other than a hydrogen ion. Examples of M include, for example, alkali metal ions such as a lithium ion, a sodium ion, a potassium ion or the like, alkaline earth metal ions such as a calcium ion, a barium ion or the like, organic ammonium ions such as a triethanolammonium ion, a diethanolammonium ion, a monoethanolammonium ion, a trimethylammonium ion, a monomethylammonium ion or the like, and others.

M is preferably an alkali metal ion or an alkanol ammonium ion, more preferably a sodium ion, a potassium ion, a triethanolammonium ion, a diethanolammonium ion or a monoethanolammonium ion and further preferably a sodium ion from the viewpoint of dispersibility in water.

Component (A) of the present invention is preferably a compound represented by the following formula 1-1 from the viewpoint of imparting lubricity against water. In other words, the present invention provides a lubricating agent containing the compound represented by the following formula 1-1. The compound of the formula 1-1 is a compound of the formula 1 in which x1 and x2 each represent 0.

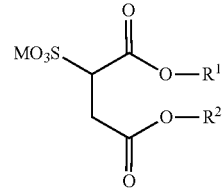

Formula 1-1 wherein $R^1$ and $R^2$ each represent a hydrocarbon group with 6 or more and 24 or less carbons, and M is a cationic ion.

The specific examples or preferable examples of $R^1$, $R^2$ and M in the formula 1-1 are the same as those in the formula 1.

Component (A) can be synthesized by a publicly-known method. For example, a maleic acid diester obtained by reacting an alcohol with maleic anhydride can be reacted with hydrogen sulfite to obtain component (A). At that time, alcohols with different numbers of carbons or structures can be used to obtain the compound of the formula 1 in which $R^1$ and $R^2$ represent hydrocarbon groups of different structures. Component (A) can be synthesized, for example, by the processes described in Examples 2 to 3 of US-A 2007/0214999.

Examples of an alcohol suitable for use in production of component (A) include
(1) a primary alcohol represented by 2-propylheptan-1-ol, 2-butyloctan-1-ol, a branched-chain decyl alcohol (for example, a decyl alcohol manufactured by KH Neochem Co. Ltd.) or the like, and
(2) a secondary alcohol represented by 5-nonanol, 2,6-dimethyl-4-heptanol or the like from the viewpoint of reactivity during the production and the viewpoint of obtaining component (A) capable of imparting excellent liquid sliding ability against water.

In the lubricating agent of the present invention, component (A) is preferably a compound selected from bis-(2-propylheptyl) sulfosuccinic acid, bis-(2-butyloctyl) sulfosuccinic acid and salts of these and more preferably a compound selected from bis-(2-propylheptyl) sulfosuccinic acid and a salt thereof from the viewpoint of lubricity against water.

In other words, examples of the lubricating agent of the present invention include a lubricating agent containing a compound selected from bis-(2-propylheptyl) sulfosuccinic acid, bis-(2-butyloctyl) sulfosuccinic acid and salts of these and preferably a compound selected from bis-(2-propylheptyl) sulfosuccinic acid and a salt thereof. Further, examples of the lubricating agent of the present invention include a lubricating agent composed of a compound selected from bis-(2-propylheptyl) sulfosuccinic acid, bis-(2-butyloctyl) sulfosuccinic acid and salts of these and preferably a compound selected from bis-(2-propylheptyl) sulfosuccinic acid and a salt thereof. The matters stated in the lubricating agent of the present invention are naturally applied to these lubricating agents.

The lubricating agent of the present invention can be targeted at various types of articles, for example, hard articles, fibers or the like.

Examples of the hard articles include, for example, tableware, cooking utensils, storage containers, bathtubs, toilet bowls, vehicles, ships, bridges, embankments, towers, monuments, roofs, floors, walls, windows, furniture, tools, machine tools, electrical appliances or the like. Examples of the materials of the hard articles include, for example, a material selected from plastic, metals, ceramic, lacquer, woods, glass, rubber, carbon materials and combinations thereof.

Examples of the plastic include thermoplastic resins such as polyethylene, polypropylene, polystyrene, acrylonitrile-styrene resin, acrylonitrile-butadiene-styrene resin, polyvinyl chloride, polyvinylidene chloride, acrylic resin, polyvinyl alcohol, polyvinyl acetate, polyamide, polyacetal, polycarbonate, polyethylene terephthalate, polybutylene terephthalate, polyphenylene sulfide, polyimide, polyetherimide, polytetrafluoroethylene, polyetheretherketone, polyarylate, polysulfone, polyethersulfone or the like, and thermosetting resins such as phenol resin, urea resin, melamine resin, polyurethane, silicone resin, epoxy resin, unsaturated polyester or the like.

Examples of the metals include steel, stainless steel (SUS304 or the like), aluminum, copper, magnesium, silicon, lead, nickel, titanium, zinc, molybdenum, carbon, gold, silver, platinum and palladium.

Examples of the ceramic include oxides (alumina, zirconia, titania, barium titanate, forsterite, steatite, ferrite or the like), hydroxides (hydroxyapatite or the like), carbides (silicon carbide, titanium carbide, boron carbide or the like), nitrides (silicon nitride, aluminum nitride, titanium nitride or the like) and sulfides (molybdenum disulfide, cadmium sulfide or the like).

Examples of the woods include Japanese cedar, Japanese cypress, ash, oak, birch, zelkova, beech, live oak, American pine, Japanese hemlock, European oak, yellow pine, maple, teak, hemlock, walnut, lauan plywood and basswood plywood.

Examples of the glass include soda lime glass, borosilicate glass, aluminosilicate glass, phosphate glass, quartz glass and lead glass.

Examples of the rubber include natural rubber and synthetic rubber. Examples of the natural rubber include high purity natural rubber, epoxidized natural rubber, hydroxylated natural rubber, hydrogenated natural rubber and grafted natural rubber. Examples of the synthetic rubber include butadiene rubber, butyl rubber, styrene butadiene rubber, nitrile rubber, acrylic rubber, chloroprene rubber, chlorobutyl rubber, ethylene-propylene rubber, ethylene vinyl acetate rubber, chlorosulfonated polyethylene rubber, epichlorohydrin rubber, polysulfide rubber, silicone rubber, fluoro rubber and urethane rubber.

Examples of the carbon materials include fullerenes, carbon nanotubes, graphene, graphene oxide, diamond, graphite, carbon black, carbon fiber or the like.

The lubricating agent of the present invention is suitable for use on fibers. It can be targeted at fibers, for example, natural fibers, synthetic fibers and semi-synthetic fibers. Further, the lubricating agent of the present invention can be targeted at textile products including these fibers.

The fibers may be either hydrophobic fibers or hydrophilic fibers. Examples of the hydrophobic fibers include, for example, protein fibers (milk protein casein fiber, promix or the like), polyamide fibers (nylon or the like), polyester fibers (polyester or the like), polyacrylonitrile fibers (acrylic or the like), polyvinyl alcohol fibers (vinylon or the like), polyvinyl chloride fibers (polyvinyl chloride or the like), polyvinylidene chloride fibers (vinylidene or the like), polyolefin fibers (polyethylene, polypropylene or the like), polyurethane fibers (polyurethane or the like), polyvinyl chloride/polyvinyl alcohol copolymer fibers (polyclar or the like), polyalkylene paraoxybenzoate fibers (benzoate or the like), polyfluoroethylene fibers (polytetrafluoroethylene or the like) and others. Examples of the hydrophilic fibers include, for example, seed hair fibers (cotton, cotton, kapok or the like), bast fibers (hemp, flax, ramie, cannabis, jute or the like), vein fibers (manila hemp, sisal hemp or the like), palm fibers, juncus, straw, animal hair fibers (wool, mohair, cashmere, camel hair, alpaca, vicuna, angora or the like), silk fibers (domestic silk, wild silk), feathers, cellulose fibers (rayon, polynosic, cupro, acetate or the like) and others.

The fibers are preferably a fiber including a hydrophilic fiber and more preferably a fiber including a cotton fiber from the viewpoint that drainability is effectively exhibited by the lubricating agent of the present invention. The content of a hydrophilic fiber and further a cotton fiber in the fiber is preferably 5 mass % or more, more preferably 10 mass % or more, further preferably 15 mass % or more, furthermore preferably 20 mass % or more and furthermore preferably 100 mass % from the same viewpoint.

In the present invention, the term "textile product" means fabrics such as woven fabrics, knitted fabrics, nonwoven fabrics or the like using the above hydrophobic fibers or hydrophilic fibers, and products such as undershirts, T-shirts, dress shirts, blouses, slacks, caps, handkerchiefs, towels, knitwear, socks, underwear, tights or the like obtained by using them. The textile products are preferably a textile product including a hydrophilic fiber and more preferably a textile product including a cotton fiber from the viewpoint that drainability is effectively exhibited by the lubricating agent of the present invention. The preferable aspect of the content of a hydrophilic fiber and further a cotton fiber in the textile product is the same as that of the content of a hydrophilic fiber and further a cotton fiber in the fiber.

The lubricating agent of the present invention may be a lubricating agent for textile products or a lubricating agent for hard articles. For example, the present invention can provide a lubricating agent for textile products or a lubricating agent for hard articles containing component (A) as the active ingredient. Further, the present invention can provide, for example, a lubricating agent containing component (A) as the active ingredient, wherein the lubricating agent is for use on textile products or hard articles.

The lubricating agent of the present invention may be an underwater treatment-type lubricating agent. The underwater treatment-type lubricating agent may be a lubricating agent to be applied to a target object in water. The underwater treatment-type lubricating agent of the present invention can be used by bringing into contact with a target object in the presence of water. For example, the agent can be used in such a manner that a target object such as a fiber or the like is immersed in a treatment liquid containing the lubricating agent of the present invention and water. Further, the agent can be used in such a manner that the treatment liquid containing the lubricating agent of the present invention and water is sprinkled, sprayed or applied to a target object such as a fiber or the like.

[Lubricating Agent Composition]

The lubricating agent composition of the present invention contains component (A).

The matters stated in the lubricating agent of the present invention can be appropriately applied to the lubricating agent composition of the present invention. The specific examples or preferable aspects of component (A) or the like are also the same as those in the lubricating agent of the present invention. The lubricating agent composition of the present invention may be an underwater treatment-type lubricating agent composition.

Examples of the lubricating agent composition of the present invention include a lubricating agent composition containing a compound selected from bis-(2-propylheptyl) sulfosuccinic acid, bis-(2-butyloctyl) sulfosuccinic acid and salts of these and preferably a compound selected from bis-(2-propylheptyl) sulfosuccinic acid and a salt thereof. Further, examples of the lubricating agent composition of the present invention include a lubricating agent composition containing a compound selected from bis-(2-propylheptyl) sulfosuccinic acid, bis-(2-butyloctyl) sulfosuccinic acid and salts of these and preferably a compound selected from bis-(2-propylheptyl) sulfosuccinic acid and a salt thereof as the active ingredient of the lubricating agent. The matters stated in the lubricating agent composition of the present invention are naturally applied to these lubricating agent compositions.

The content of component (A) in the lubricating agent composition of the present invention is preferably 1 mass % or more, more preferably 2 mass % or more and further preferably 4 mass % or more from the viewpoint of transportability, and preferably 90 mass % or less, more preferably 70 mass % or less and further preferably 50 mass % or less from the viewpoint of handleability of the lubricating agent composition (hereinafter also simply referred to as handleability).

The lubricating agent composition of the present invention can further contain (B) a surfactant [excluding component (A)] [hereinafter referred to as component (B)]. Component (B) is a preferable component from the viewpoint of miscibility with component (A) and the viewpoint of less inhibiting the dehydration promoting effect of component (A).

Examples of component (B) include one or more surfactants selected from an anionic surfactant [excluding component (A)], a nonionic surfactant, a cationic surfactant and an amphoteric surfactant.

Examples of the anionic surfactant [excluding component (A)] can include, for example, an alkyl sulfate, a polyoxyalkylene alkyl ether sulfate, an alkane sulfonate, an alkylbenzene sulfonate, a higher fatty acid or a salt thereof, a polyoxyethylene alkyl ether carboxylic acid or a salt thereof, a N-acyl amino acid or a salt thereof, an alkyl phosphate, a polyoxyethylene alkyl ether phosphate or the like. The anionic surfactant has an alkyl group, for example, with 8 or more and 20 or less carbons. The anionic surfactant has an average number of added moles of an oxyalkylene group, for example, an oxyethylene group of, for example, 0 or more and 4 or less and preferably more than 0 and 4 or less. The anionic surfactant is a salt, for example, an alkali metal salt such as a sodium salt, a potassium salt or the like.

Examples of the nonionic surfactant can include, for example, an alkyl mono glyceryl ether, a polyoxyalkylene mono alkyl or alkenyl ether, an alkyl (poly)glycoside (a glycoside-type nonionic surfactant), a sorbitan-based nonionic surfactant, an aliphatic alkanol amide, a fatty acid monoglyceride, a sucrose fatty acid ester, an amidated product of an alkanol amine such as monoethanolamine, diethanolamine, methyl monoethanolamine or the like with a fatty acid such as lauric acid, myristic acid or the like, and others. The nonionic surfactant has an alkyl group or an alkenyl group, for example, with 6 or more and 18 or less carbons. The nonionic surfactant has an average number of added moles of an oxyalkylene group, for example, an oxyethylene group of, for example, 3 or more and 25 or less.

Examples of the amphoteric surfactant can include, for example, a N-alkanoyl aminopropyl-N,N-dimethylamine oxide, a N-alkyl-N,N-dimethylamine oxide, a N-alkanoyl aminopropyl-N,N-dimethyl-N-carboxymethyl ammonium betaine, a N-alkyl-N,N-dimethyl-N-carboxymethyl ammonium betaine, a N-alkyl-N,N-dimethyl-N-sulfopropyl ammonium sulfobetaine, a N-alkyl-N,N-dimethyl-N-(2-hydroxysulfopropyl) ammonium sulfobetaine, a N-alkanoyl aminopropyl-N,N-dimethyl-N-sulfopropyl ammonium sulfobetaine, a N-alkanoyl aminopropyl-N,N-dimethyl-N-(2-hydroxysulfopropyl) ammonium sulfobetaine or the like. The alkanoyl groups in these are, for example, lauroyl or myristyroyl. Further, the alkyl groups in these are, for example, lauryl groups or myristyl groups.

Component (B) is preferably one or more surfactants selected from anionic surfactants such as sodium internal olefin sulfonate with 18 carbons, sodium dodecyl benzene sulfonate or the like, nonionic surfactants such as a sodium polyoxyethylene/polyoxypropylene lauryl ether sulfate (for example, a compound with an average number of added moles of ethylene oxide of 1.5 and an average number of added moles of propylene oxide of 0.4 in which the polyoxyethylene group and the polyoxypropylene group are bonded to the lauryl group in blocks in this order), a polyoxyethylene lauryl ether (for example, with an average number of added moles of ethylene oxide of 8), a polyoxyethylene lauryl ether (for example, with an average number of added moles of ethylene oxide of 21) or the like, and amphoteric surfactants such as lauryl betaine, lauryl dimethyl aminoacetic acid betaine, 2-cocoyl-N-carboxymethyl-N-hydroxyethyl imidazolinium betaine or the like from the viewpoint of miscibility with component (A) and the viewpoint of less inhibiting the dehydration promoting effect of component (A).

When the lubricating agent composition of the present invention contains component (B), the mass ratio between the content of component (A) and the content of component (B), (B)/(A), may be, for example, 10 or less, further 3 or less, further 2 or less, further 1.5 or less, further 1 or less, further 0.80 or less, further 0.70 or less and further 0.67 or less, and 0.001 or more, further 0.01 or more, further 0.1 or more and further 0.5 or more from the viewpoint of lubricity against water.

The lubricating agent composition of the present invention preferably contains water from the viewpoint of handleability. It is preferably a liquid composition containing water. Water usually occupies the balance of the composition and is used in such an amount that makes the total of the composition 100 mass %.

The water content of the lubricating agent composition of the present invention is preferably 10 mass % or more, more preferably 30 mass % or more and further preferably 50 mass % or more, and preferably 99 mass % or less, more preferably 98 mass % or less and further preferably 96 mass % or less from the viewpoint of handleability. The water content may be the balance excluding component (A) and optional components other than water.

The lubricating agent composition of the present invention further contains preferably at least one selected from butyldiglycol (BDG), propylene glycol (PG), phenylglycol, ethanol, isopropanol and paratoluenesulfonate and more preferably at least one selected from BDG and PG from the viewpoint of actual use.

The proportion of component (A) in components other than water in the lubricating agent composition of the present invention is, for example, preferably 70 mass % or more, more preferably 80 mass % or more and further preferably 90 mass % or more, and 100 mass % or less from the viewpoint of imparting lubricity against water to target objects.

The lubricating agent composition of the present invention may be a lubricating agent composition for textile products or a lubricating agent composition for hard articles. For example, the present invention can provide a lubricating agent composition for textile products or a lubricating agent composition for hard articles containing component (A) as the active ingredient of the lubricating agent. Further, the present invention can provide, for example, a lubricating agent composition containing component (A) as the active ingredient of the lubricating agent, wherein the lubricating agent composition is for use on textile products or hard articles.

It is considered that, taking advantage of the capability of component (A), the lubricating agent composed of component (A) and the lubricating agent composition containing component (A) to form a liquid sliding surface on the surfaces of target objects, they can be used in various applications. Note that, in the present invention, the liquid sliding surface may be the surface of a substance including component (A) and water. Further, in the present invention, the liquid sliding surface may act on water coming in contact with the liquid sliding surface separately from water in the substance forming the liquid sliding surface.

Examples of the applications in which component (A), the lubricating agent composed of component (A) or the lubricating agent composition containing component (A) is used include the following. In the following, the term "component (A)" may mean "component (A), the lubricating agent composed of component (A) or the lubricating agent composition containing component (A)."

For example, the present invention provides an agent for promoting dehydration during washing containing component (A). Here, "washing" has a broad meaning that may encompass a washing step, a rinsing step, a dehydration step or the like (the same applies hereinafter).

Further, the present invention provides, for example, a water-permeability improving agent and further a water-permeability improving agent for textile products or hard articles containing component (A).

Further, the present invention provides, for example, a water-absorbency enhancing agent and further a water-absorbency enhancing agent for textile products or hard articles containing component (A).

Further, the present invention provides, for example, a lubricity imparting agent and further a lubricity imparting agent for textile products or hard articles containing component (A).

Further, the present invention provides, for example, a liquid-sliding-surface forming agent and further a liquid-sliding-surface forming agent for textile products or hard articles containing component (A).

Further, the present invention provides, for example, a water-film forming agent and further a water-film forming agent for textile products or hard articles containing component (A).

Further, the present invention provides, for example, a wet-lubricant forming agent and further a wet-lubricant forming agent for textile products or hard articles containing component (A).

Further, the present invention provides, for example, a drying promoting agent and further a drying promoting agent for textile products or hard articles containing component (A).

Further, the present invention provides, for example, a friction reducing agent and further a friction reducing agent for textile products or hard articles containing component (A).

Further, the present invention provides, for example, a dewaterability enhancing agent and further a dewaterability enhancing agent for textile products or hard articles containing component (A).

Further, the present invention provides, for example, an agent for inhibiting entanglement during washing containing component (A).

Further, the present invention provides, for example, a surface modifying agent and further a modifying agent for use on the surfaces of fibers or the surfaces of hard articles containing component (A).

Further, the present invention provides, for example, a fiber modifying agent containing component (A).

Further, the present invention provides, for example, a fiber treatment agent or a hard-article treatment agent containing component (A).

Further, the present invention provides, for example, a hydrophilicity imparting agent and further a hydrophilicity imparting agent for textile products or hard articles containing component (A). Here, imparting hydrophilicity refers, for example, to forming a water-bearing gel layer on target surfaces (target objects) or changing the surfaces so as not to form meniscus thereon, i.e., imparting properties different from common hydrophilicity.

All those agents may be of an underwater treatment type. Further, all those agents can be targeted at hard articles, textile products or the like, and those for use on textile products are one of the preferable aspects. Further, those agents can contain optional components such as water, component (B) or the like.

[Method for Treating Target Object]

The present invention provides a method for treating a target object including, adhering component (A) and water to the target object to form a liquid sliding surface against water. It is preferable to use the lubricating agent or the lubricating agent composition of the present invention in the treatment method of the present invention. The liquid sliding surface formed in the treatment method of the present invention may be capable of separating water from the target object in liquid form.

The matters stated in the lubricating agent or the lubricating agent composition of the present invention can be appropriately applied to the treatment method of the present invention. The specific examples or preferable aspects of component (A) or the like are also the same as those in the lubricating agent of the present invention. The treatment method of the present invention can be carried out, for example, as a treatment method including applying component (A) to a target object in water.

In the treatment method of the present invention, it is preferable to bring component (A), the lubricating agent of the present invention or the lubricating agent composition of the present invention into contact with the target object in the presence of water from the viewpoint of forming the liquid sliding surface against water, and it is more preferable to bring a treatment liquid containing component (A) and water (hereinafter also referred to as the treatment liquid of the present invention) into contact with the target object from the viewpoint of workability. In the treatment method of the present invention, the target object is preferably treated with the treatment liquid of the present invention. The treatment liquid of the present invention may be a liquid for treating the target object with component (A). Further, the treatment liquid of the present invention may be obtained by mixing the lubricating agent or the lubricating agent composition of the present invention with water. Further, when the lubricating agent composition of the present invention contains component (A) at a concentration suitable for the treatment, the composition can be used as-is as the treatment liquid of the present invention. Examples of a method for bringing the treatment liquid of the present invention into contact with the target object include a method of immersing the target object in the treatment liquid of the present invention, a method of sprinkling the treatment liquid of the present invention on the target object or the like. Further, the treatment liquid of the present invention can also be brought into contact with the target object by spraying or applying.

The treatment liquid of the present invention can contain component (A) in an amount of, for example, 0.0001 mass % or more, 0.001 mass % or more, further 0.002 mass % or more, further 0.01 mass % or more, further 0.02 mass % or more, further 0.1 mass % or more and further 0.2 mass % or more, and 20 mass % or less, further 10 mass % or less, further 5 mass % or less and further 1 mass % or less.

When the target object is immersed in the treatment liquid of the present invention, the treatment liquid can contain component (A) in an amount of, for example, 0.0001 mass % or more, 0.001 mass % or more, further 0.01 mass % or more and further 0.1 mass % or more, and 20 mass % or less, further 10 mass % or less, further 5 mass % and further 1 mass % or less, depending on the target object. The immersion can be carried out with a treatment bath, for example, a treatment bath composed by including the treatment liquid of the present invention and a vessel for containing the treatment liquid of the present invention.

When the treatment liquid of the present invention is sprinkled on the target object, the treatment liquid can contain component (A) in an amount of, for example, 0.002 mass % or more, further 0.02 mass % or more and further 0.2 mass % or more, and 5 mass % or less, further 2 mass % or less and further 1 mass % or less from the viewpoint of forming the liquid sliding surface against water.

In the present invention, component (A) is preferably used by mixing with water having a hardness of 0°DH or more and 30°DH or less. In other words, the target object such as a fiber, a hard article or the like is preferably treated with a treatment liquid obtained by mixing component (A) with water having a hardness of 0°DH or more and 30°DH or less. The hardness of water is preferably 1°DH or more, more preferably 2°DH or more and further preferably 3°DH or more from the viewpoint of lubricity against water. Further, the hardness of water may be 25°DH or less and 20°DH or less.

The treatment liquid of the present invention may have a hardness of 0°DH or more and 30°DH or less. The hardness of the treatment liquid of the present invention is preferably 1°DH or more, more preferably 2°DH or more and further preferably 3°DH or more from the viewpoint of lubricity against water. Further, the hardness of the treatment liquid of the present invention may be 25°DH or less and 20°DH or less.

In the treatment method of the present invention, component (B) can be used together with component (A). In other words, (B) a surfactant [excluding component (A)] can further be adhered to the target object together with component (A) and water. The specific examples of component (B), the preferable values of (B)/(A) or the like are the same as those in the lubricating agent composition of the present invention. When component (B) is used, the lubricating agent composition of the present invention containing component (B) can be used. When the treatment bath as described above is used, the treatment bath can contain component (B).

The treatment method of the present invention can be targeted at fibers, hard articles or the like. The treatment method of the present invention is preferably targeted at fibers and further textile products from the viewpoint of promoting dehydration. An aspect for treating a fiber of the present invention (hereinafter also referred to as the method for treating a fiber of the present invention) will be explained by way of example.

When a fiber is treated, the fiber is preferably treated by the method of immersing the target object in the treatment liquid of the present invention, for example, the treatment bath containing the treatment liquid of the present invention. Further, the treatment liquid of the present invention may be sprinkled on the fiber.

In the method for treating a fiber of the present invention, component (A) is used in an amount relative to the fiber of preferably 0.01% o.w.f. or more, more preferably 0.03% o.w.f. or more, further preferably 0.05% o.w.f. or more, furthermore preferably 0.1% o.w.f. or more, furthermore preferably 0.2% o.w.f. or more and furthermore preferably 0.3% o.w.f. or more from the viewpoint of lubricity against water, and preferably 5% o.w.f. or less, more preferably 4% o.w.f. or less, further preferably 3% o.w.f. or less and furthermore preferably 2% o.w.f. or less from the viewpoint of performance in terms of finishes such as textures after drying or the like. Note that "% o.w.f." stands for "% on the weight of fabric" and means the percentage of the mass of component (A) relative to the mass of the fiber. The treatment liquid of the present invention can be used such that the amount of component (A) relative to the fiber falls within the above range.

In the method for treating a fiber of the present invention, the bath ratio (the mass of the treatment liquid (kg) relative to 1 kg of the fiber) is preferably 2 or more, more preferably 5 or more and further preferably 7 or more, and may be 100 or less, 70 or less, 50 or less and 30 or less from the viewpoint of ensuring uniformity of the treatment and lubricity.

The method for treating a fiber of the present invention can be targeted at the fibers stated in the lubricating agent of the present invention. For example, the fiber may be a fiber of cloth.

The method for treating a fiber of the present invention can be carried out by incorporating into a washing process of a fiber, for example, a fiber of cloth. Here, the washing process may be a treatment including washing, rinsing and dehydrating the fiber. In the present invention, during any of these steps of the washing process, the lubricating agent or the lubricating agent composition of the present invention can be applied to the fiber such that component (A) is in a predetermined amount.

The treatment method of the present invention is preferably targeted at a hard article from the viewpoint of dewaterability. An aspect for treating a hard article of the present invention (hereinafter also referred to as the method for treating a hard article of the present invention) will be explained by way of example.

When a hard article is treated, the hard article is preferably immersed in the treatment liquid of the present invention, for example, treated with the treatment bath containing the treatment liquid of the present invention. Further, the treatment liquid of the present invention may be sprinkled on the hard article.

In the method for treating a hard article of the present invention, the content of component (A) in the treatment liquid of the present invention is preferably 1 ppm or more, more preferably 2 ppm or more, further preferably 5 ppm or more and furthermore preferably 10 ppm or more from the viewpoint of imparting lubricity against water to the target object. Further, the content of component (A) in the treatment liquid of the present invention is preferably 5000 ppm or less, more preferably 2000 ppm or less and further preferably 1000 ppm or less from the viewpoint of being able to ensure visibility without forming flocculates or the like on the surface of the hard article after the treatment (hereinafter also simply referred to as visibility).

In the method for treating a hard article of the present invention, the treating amount of component (A) per surface area of the target object is preferably 2.7 $\mu g/cm^2$ or more, more preferably 5.4 $\mu g/cm^2$ or more, further preferably 13.6 $\mu g/cm^2$ or more and furthermore preferably 27.1 $\mu g/cm^2$ or more from the viewpoint of imparting lubricity against water to the target object. Further, it is preferably 13600 $\mu g/cm^2$ or less, more preferably 5420 $\mu g/cm^2$ or less and further preferably 2710 $\mu g/cm^2$ or less from the viewpoint of being able to ensure visibility.

The treatment method of the present invention can be carried out, for example, as a treatment method for forming a wet lubricant including, applying component (A) to a target object, for example, a fiber and/or a hard article, in water.

Further, the treatment method of the present invention can be carried out, for example, as a treatment method for promoting dehydration including, applying component (A) to a target object, for example, a fiber and/or a hard article, in water.

Further, the treatment method of the present invention can be carried out, for example, as a treatment method for promoting drying including, applying component (A) to a target object, for example, a fiber and/or a hard article, in water.

Further, the treatment method of the present invention can be carried out, for example, as a treatment method for reducing friction including, applying component (A) to a target object, for example, a fiber and/or a hard article, in water.

Further, the treatment method of the present invention can be carried out, for example, as a treatment method for enhancing dewaterability including, applying component (A) to a target object, for example, a fiber and/or a hard article, in water.

Further, the treatment method of the present invention can be carried out, for example, as a treatment method for inhibiting entanglement during washing including, applying component (A) to a target object, for example, a fiber, in water.

In these treatment methods, component (B) can be used together with component (A).

Further, the present invention provides, for example, a method for promoting dehydration during washing including, applying component (A) to washing in water, and thereafter dehydrating the washing. In this method, component (A) may be applied to the washing, for example, during washing and/or during rinsing.

Further, the present invention provides, for example, a method for improving water permeability and further a method for improving water permeability of a textile product and/or a hard article including, applying component (A) to a target object, for example, the textile product and/or the hard article, in water.

Further, the present invention provides, for example, a method for enhancing water absorbency and further a method for enhancing water absorbency of a textile product and/or a hard article including, applying component (A) to a target object, for example, the textile product and/or the hard article, in water.

Further, the present invention provides, for example, a method for imparting lubricity and further a method for imparting lubricity to a textile product and/or a hard article including, applying component (A) to a target object, for example, the textile product and/or the hard article, in water.

Further, the present invention provides, for example, a method for forming a liquid sliding surface and further a method for forming a liquid sliding surface on a textile product and/or a hard article including, applying component (A) to a target object, for example, the textile product and/or the hard article, in water.

Further, the present invention provides, for example, a method for forming a water film and further a method for forming a water film on a textile product and/or a hard article including, applying component (A) to a target object, for example, the textile product and/or the hard article, in water.

Further, the present invention provides, for example, a method for forming a wet lubricant and further a method for forming a wet lubricant on a textile product and/or a hard article including, applying component (A) to a target object, for example, the textile product and/or the hard article, in water.

Further, the present invention provides, for example, a method for promoting drying and further a method for promoting drying of a textile product and/or a hard article including, applying component (A) to a target object, for example, the textile product and/or the hard article, in water.

Further, the present invention provides, for example, a method for reducing friction and further a method for reducing friction of a textile product and/or a hard article including, applying component (A) to a target object, for example, the textile product and/or the hard article, in water.

Further, the present invention provides, for example, a method for enhancing dewaterability and further a method for enhancing dewaterability of a textile product and/or a hard article including, applying component (A) to a target object, for example, the textile product and/or the hard article, in water.

Further, the present invention provides, for example, a method for inhibiting entanglement during washing including, applying component (A) to a textile product in water.

Further, the present invention provides, for example, a surface modifying method including, applying component (A) to a target object, for example, a textile product and/or a hard article, in water.

Further, the present invention provides, for example, a method for modifying a fiber including, applying component (A) to the fiber in water.

Further, the present invention provides, for example, a method for treating a fiber and/or a hard article including, applying component (A) to the fiber and/or the hard article in water.

Further, the present invention provides, for example, a method for imparting hydrophilicity and further a method for imparting hydrophilicity to a textile product and/or a hard article including, applying component (A) to a target object, for example, the textile product and/or the hard article, in water.

Further, the present invention provides, for example, a method for ensuring a uniform surface state of a target object and further a method for ensuring uniform surface states of a textile product and/or a hard article including, applying component (A) to the target object, for example, the textile product and/or the hard article, in water.

In these methods, component (B) can be used together with component (A).

The present invention provides a method for treating a target object including, adhering component (A) and water to the target object to form a liquid sliding surface against water on the target object, and sliding water coming in contact with the liquid sliding surface over the liquid sliding surface to separate the water from the target object.

Further, the present invention provides a method for treating a target object including, adhering component (A) and water to the target object to form a liquid sliding surface against water on the target object, wherein the liquid sliding surface is capable of sliding water coming in contact with the liquid sliding surface over the liquid sliding surface to separate the water from the target object.

Further, the present invention provides a method for treating a target object including, adhering component (A) and water to the target object to form a liquid sliding surface against water on the target object, and sliding water coming in contact with the liquid sliding surface over the liquid sliding surface to separate the water from the target object, thereby reducing the amount of water retained in the target object.

Further, the present invention provides a method for treating a target object including, adhering component (A) and water to the target object to form a liquid sliding surface against water on the target object, wherein the liquid sliding surface is capable of sliding water coming in contact with the liquid sliding surface over the liquid sliding surface to separate the water from the target object, thereby reducing the amount of water retained in the target object.

These methods can be carried out, for example, as a dehydration method, a water discharge method, an effluent disposal method or the like.

In these methods, component (B) can be used together with component (A).

In these methods, water can be separated from the target object in a liquid state.

The present invention provides use of component (A) to form a lubricating surface against water on a target object.

Further, the present invention provides use of component (A) to form a lubricating surface against water on a target object, wherein the liquid sliding surface is capable of sliding water coming in contact with the liquid sliding surface over the liquid sliding surface to separate the water from the target object.

Further, the present invention provides use of component (A) for a treatment including adhering component (A) and water to a target object to form a liquid sliding surface against water on the target object and sliding water coming in contact with the liquid sliding surface over the liquid sliding surface to separate the water from the target object, thereby reducing the amount of water retained in the target object.

These uses can be carried out, for example, as use in dehydration, water discharge, effluent disposal or the like.

In these uses, component (B) can be used together with component (A).

In these uses, water can be separated from the target object in a liquid state.

The aspects of the present invention are described below by way of example. The matters stated in the lubricating agent, the lubricating agent composition and the method for treating a target object of the present invention can be applied to these aspects with modifications as necessary. Further, the subject matter of each aspect can be applied to other aspects with modifications as necessary.

<1>

A lubricating agent containing (A) a compound represented by the following formula 1 [hereinafter referred to as component (A)]:

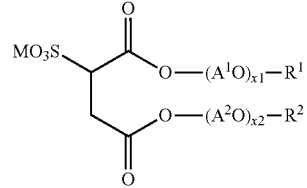

Formula 1 wherein $R^1$ and $R^2$ each represent a hydrocarbon group with 6 or more and 24 or less carbons; $A^1O$ and $A^2O$ each represent an alkyleneoxy group with 2 or more and 4 or less carbons; x1 and x2 are average numbers of added moles, and each represent a number of 0 or more and 10 or less; and M is a cationic ion.

<2>

The lubricating agent according to <1>, wherein the agent is an agent capable of imparting lubricity against water to a target object, and contains the compound of component (A) as the active ingredient thereof.

<3>

The lubricating agent according to <1> or <2>, composed of component (A) and further composed of one or more of component (A).

<4>

The lubricating agent according to any of <1> to <3>, wherein the hydrocarbon groups of $R^1$ and $R^2$ in the formula 1 are each a hydrocarbon group selected from an alkyl group and an alkenyl group.

<5>
The lubricating agent according to any of <1> to <4>, wherein the hydrocarbon groups of $R^1$ and $R^2$ in the formula 1 each have 6 or more, preferably 8 or more, more preferably 9 or more and further preferably 10 or more, and 24 or less, preferably 20 or less, more preferably 17 or less and further preferably 12 or less carbons.

<6>
The lubricating agent according to any of <1> to <5>, wherein the hydrocarbon groups of $R^1$ and $R^2$ in the formula 1 each have preferably 10 or more, and preferably 14 or less and more preferably 12 or less carbons.

<7>
The lubricating agent according to any of <1> to <6>, wherein the total number of carbons in $R^1$ and $R^2$ in the formula 1 is preferably 18 or more and more preferably 20 or more, and preferably 30 or less, more preferably 28 or less, further preferably 26 or less, furthermore preferably 24 or less and furthermore preferably 22 or less.

<8>
The lubricating agent according to any of <1> to <7>, wherein the hydrocarbon groups of $R^1$ and $R^2$ in the formula 1 are each a straight chain or a branched chain and further each include a branched chain.

<9>
The lubricating agent according to any of <1> to <8>, wherein the hydrocarbon groups of $R^1$ and $R^2$ in the formula 1 are each a branched chain, and the branched chain has a side chain with 2 or more and further 3 or more, and 10 or less, further 8 or less and further 6 or less carbons.

<10>
The lubricating agent according to any of <1> to <9>, wherein the hydrocarbon groups of $R^1$ and $R^2$ in the formula 1 are each a saturated or unsaturated hydrocarbon group.

<11>
The lubricating agent according to any of <1> to <10>, wherein the hydrocarbon groups of $R^1$ and $R^2$ in the formula 1 are straight-chain unsaturated hydrocarbon groups.

<12>
The lubricating agent according to any of <1> to <11>, wherein at least one of $R^1$ and $R^2$ in the formula 1 represents a hydrocarbon group having a branching structure or an unsaturated bond.

<13>
The lubricating agent according to any of <1> to <12>, wherein the hydrocarbon groups of $R^1$ and $R^2$ in the formula 1 each include a saturated branched-chain hydrocarbon group or an unsaturated straight-chain hydrocarbon group.

<14>
The lubricating agent according to any of <1> to <13>, wherein the hydrocarbon groups of $R^1$ and $R^2$ in the formula 1 are each a branched-chain hydrocarbon group derived from a Guerbet alcohol.

<15>
The lubricating agent according to any of <1> to <14>, wherein the hydrocarbon groups of $R^1$ and $R^2$ in the formula 1 are each a branched-chain hydrocarbon group with 10 carbons and further a branched-chain hydrocarbon group derived from an alcohol with 10 carbons having a branched chain.

<16>
The lubricating agent according to any of <1> to <15>, wherein the hydrocarbon groups of $R^1$ and $R^2$ in the formula 1 are each a branched-chain hydrocarbon group and further a saturated branched-chain hydrocarbon group.

<17>
The lubricating agent according to any of <1> to <16>, wherein $R^1$ and $R^2$ in the formula 1 each represent a branched-chain alkyl group with 10 or more and 12 or less carbons and further a branched-chain alkyl group with 10 carbons.

<18>
The lubricating agent according to any of <1> to <17>, wherein $R^1$ and $R^2$ in the formula 1 each represent a branched-chain alkyl group with 10 or more and 12 or less carbons, and the total of the numbers of carbons constituting side chains in the branched-chain alkyl group is preferably 1 or more and more preferably 2 or more, and preferably 4 or less, more preferably 3 or less and further preferably 3.

<19>
The lubricating agent according to any of <1> to <18>, wherein $R^1$ and $R^2$ in the formula 1 each represent a branched-chain alkyl group with 10 or more and 12 or less carbons, and the numbers of side chains in $R^1$ and $R^2$ are each 1 or more, and preferably 3 or less, more preferably 2 or less and further preferably 1.

<20>
The lubricating agent according to any of <1> to <19>, wherein $R^1$ and $R^2$ in the formula 1 each represent a branched-chain alkyl group with 10 or more and 12 or less carbons, and the side chains in $R^1$ and $R^2$ are each a straight chain.

<21>
The lubricating agent according to any of <1> to <20>, wherein $R^1$ and $R^2$ in the formula 1 each represent a branched-chain alkyl group with 10 or more and 12 or less carbons, and the numbers of branching carbons in $R^1$ and $R^2$ are each 1 or more, and preferably 3 or less, more preferably 2 or less and further preferably 1.

<22>
The lubricating agent according to any of <1> to <21>, wherein $R^1$ and $R^2$ in the formula 1 each represent a branched-chain alkyl group with 10 or more and 12 or less carbons, and in the branched-chain alkyl groups, the main chains each have 7 or 8 carbons, the numbers of carbons constituting side chains are each preferably 1 or more and 4 or less, more preferably 2 or more and 4 or less, further preferably 2 or more and 3 or less and furthermore preferably 3, and the numbers of side chains are each preferably 3 or less, more preferably 2 or less and further preferably 1.

<23>
The lubricating agent according to any of <1> to <22>, wherein $R^1$ and $R^2$ in the formula 1 each represent a branched-chain alkyl group selected from a branched-chain decyl group and a branched-chain dodecyl group and further a branched-chain decyl group.

<24>
The lubricating agent according to <23>, wherein the branched-chain decyl group is a 2-propylheptyl group, and the branched-chain dodecyl group is a 2-butyloctyl group.

<25>
The lubricating agent according to any of <1> to <24>, wherein $R^1$ and $R^2$ in the formula 1 each represent a branched-chain hydrocarbon group with 10 or more and 12 or less carbons derived from a Guerbet alcohol.

<26>
The lubricating agent according to any of <1> to <25>, wherein $A^1O$ and $A^2O$ in the formula 1 each represent an alkyleneoxy group with 2 or more and 4 or less carbons and preferably 2 or 3 carbons.

<27>
The lubricating agent according to any of <1> to <26>, wherein x1 and x2 in the formula 1 each represent 0 or more, and 10 or less, preferably 6 or less, more preferably 4 or less, further preferably 2 or less and furthermore preferably 0.
<28>
The lubricating agent according to any of <1> to <27>, wherein M in the formula 1 is a cationic ion other than a hydrogen ion, further a cationic ion selected from alkali metal ions such as a lithium ion, a sodium ion, a potassium ion or the like, alkaline earth metal ions such as a calcium ion, a barium ion or the like, and organic ammonium ions such as a triethanolammonium ion, a diethanolammonium ion, a monoethanolammonium ion, a trimethylammonium ion, a monomethylammonium ion or the like, further a cationic ion selected from the alkali metal ions and the alkanolammonium ions, further a cationic ion selected from a sodium ion, a potassium ion, a triethanolammonium ion, a diethanolammonium ion and a monoethanolammonium ion, and further a sodium ion.
<29>
The lubricating agent according to any of <1> to <26> and <28>, wherein component (A) is a compound represented by the following formula 1-1:

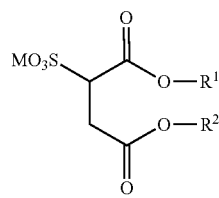

Formula 1-1 wherein $R^1$ and $R^2$ each represent a hydrocarbon group with 6 or more and 24 or less carbons, and M is a cationic ion; and
aspects selected from the aspects specified in the clauses preceding the present clause can each be applied to $R^1$, $R^2$ and M in the formula 1-1.
<30>
The lubricating agent according to any of <1> to <29>, wherein component (A) is a compound selected from bis-(2-propylheptyl) sulfosuccinic acid, bis-(2-butyloctyl) sulfosuccinic acid and salts of these and further a compound selected from bis-(2-propylheptyl) sulfosuccinic acid and a salt thereof.
<31>
The lubricating agent according to any of <1> to <30>, containing as component (A) a compound selected from bis-(2-propylheptyl) sulfosuccinic acid, bis-(2-butyloctyl) sulfosuccinic acid and salts of these and preferably a compound selected from bis-(2-propylheptyl) sulfosuccinic acid and a salt thereof.
<32>
The lubricating agent according to any of <1> to <31>, wherein the agent is composed of component (A), and component (A) is a compound selected from bis-(2-propylheptyl) sulfosuccinic acid, bis-(2-butyloctyl) sulfosuccinic acid and salts of these and preferably a compound selected from bis-(2-propylheptyl) sulfosuccinic acid and a salt thereof.
<33>
The lubricating agent according to any of <1> to <32>, wherein the agent is an underwater treatment-type lubricating agent.

<34>
The lubricating agent according to any of <1> to <33>, wherein the agent is used by bringing into contact with a target object in the presence of water.
<35>
The lubricating agent according to any of <1> to <34>, wherein the agent is used in such a manner that a target object such as a fiber or the like is immersed in a treatment liquid containing the lubricating agent and water.
<36>
The lubricating agent according to any of <1> to <35>, wherein the agent is used in such a manner that a treatment liquid containing the lubricating agent and water is sprinkled, sprayed or applied to a target object such as a fiber or the like.
<37>
The lubricating agent according to any of <1> to <36>, wherein the agent forms a liquid sliding surface against water.
<38>
A lubricating agent composition containing (A) a compound represented by the following formula 1 [hereinafter referred to as component (A)]:

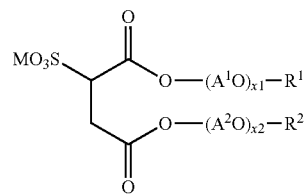

Formula 1 wherein $R^1$ and $R^2$ each represent a hydrocarbon group with 6 or more and 24 or less carbons; $A^1O$ and $A^2O$ each represent an alkyleneoxy group with 2 or more and 4 or less carbons; x1 and x2 are average numbers of added moles, and each represent a number of 0 or more and 10 or less; and M is a cationic ion.
<39>
The lubricating agent composition according to <38>, containing component (A) in an amount of preferably 1 mass % or more, more preferably 2 mass % or more and further preferably 4 mass % or more, and preferably 90 mass % or less, more preferably 70 mass % or less and further preferably 50 mass % or less.
<40>
The lubricating agent composition according to <38> or <39>, further containing (B) a surfactant [excluding component (A)] [hereinafter referred to as component (B)].
<41>
The lubricating agent composition according to <40>, wherein component (B) is one or more surfactants selected from an anionic surfactant [excluding component (A)], a nonionic surfactant, a cationic surfactant and an amphoteric surfactant.
<42>
The lubricating agent composition according to <40> or <41>, wherein component (B) is one or more surfactants selected from anionic surfactants such as sodium internal olefin sulfonate with 18 carbons, sodium dodecyl benzene sulfonate or the like, nonionic surfactants such as a sodium polyoxyethylene/polyoxypropylene lauryl ether sulfate (for example, a compound with an average number of added moles of ethylene oxide of 1.5 and an average number of added moles of propylene oxide of 0.4 in which the polyoxyethylene group and the polyoxypropylene group are bonded to the lauryl group in blocks in this order), a polyoxyethylene lauryl ether (for example, with an average number of added moles of ethylene oxide of 8), a polyoxyethylene lauryl ether (for example, with an average number of added moles of ethylene oxide of 21) or the like, and amphoteric surfactants such as lauryl betaine, lauryl dimethyl aminoacetic acid betaine, 2-cocoyl-N-carboxymethyl-N-hydroxyethyl imidazolinium betaine or the like.

<43>

The lubricating agent composition according to any of <40> to <42>, wherein a mass ratio between the content of component (A) and the content of component (B), (B)/(A), is 10 or less, further 3 or less, further 2 or less, further 1.5 or less, further 1 or less, further 0.80 or less, further 0.70 or less and further 0.67 or less, and 0.001 or more, further 0.01 or more, further 0.1 or more and further 0.5 or more.

<44>

The lubricating agent composition according to any of <38> to <43>, containing water, and further containing water in an amount of preferably 10 mass % or more, more preferably 30 mass % or more and further preferably 50 mass % or more, and preferably 99 mass % or less, more preferably 98 mass % or less and further preferably 96 mass % or less.

<45>

The lubricating agent composition according to any of <38> to <44>, containing at least one selected from butyldiglycol (BDG), propylene glycol (PG), phenylglycol, ethanol, isopropanol and paratoluenesulfonate, and preferably containing at least one selected from BDG and PG.

<46>

The lubricating agent composition according to any of <38> to <45>, wherein a proportion of component (A) in components other than water is preferably 70 mass % or more, more preferably 80 mass % or more and further preferably 90 mass % or more, and 100 mass % or less.

<47>

The lubricating agent composition according to any of <38> to <46>, wherein the composition is a lubricating agent composition for textile products or a lubricating agent composition for hard articles.

<48>

The lubricating agent composition according to any of <38> to <46>, wherein the composition contains component (A) as the active ingredient of the lubricating agent, and is a lubricating agent composition for textile products or a lubricating agent composition for hard articles.

<49>

The lubricating agent composition according to any of <38> to <46>, wherein the composition contains component (A) as the active ingredient of the lubricating agent, and is for use on textile products or hard articles.

<50>

The lubricating agent composition according to any of <38> to <49>, wherein the composition forms a liquid sliding surface against water.

<51>

The lubricating agent composition according to any of <38> to <50>, wherein the composition is of an underwater treatment type.

<52>

An agent for promoting dehydration during washing containing component (A).

<53>

A lubricity imparting agent and further a lubricity imparting agent for textile products or hard articles containing component (A).

<54>

A liquid-sliding-surface forming agent and further a liquid-sliding-surface forming agent for textile products or hard articles containing component (A).

<55>

A water-film forming agent and further a water-film forming agent for textile products or hard articles containing component (A).

<56>

A wet-lubricant forming agent and further a wet-lubricant forming agent for textile products or hard articles containing component (A).

<57>

A dewaterability enhancing agent and further a dewaterability enhancing agent for textile products or hard articles containing component (A).

<58>

A surface modifying agent and further a modifying agent for use on the surfaces of fibers or the surfaces of hard articles containing component (A).

<59>

A hydrophilicity imparting agent and further a hydrophilicity imparting agent for textile products or hard articles containing component (A).

<60>

A method for treating a target object including, adhering (A) a compound represented by the following formula 1 [hereinafter referred to as component (A)] and water to the target object to form a liquid sliding surface against water on the target object,

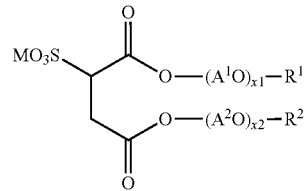

Formula 1 wherein $R^1$ and $R^2$ each represent a hydrocarbon group with 6 or more and 24 or less carbons; $A^1O$ and $A^2O$ each represent an alkyleneoxy group with 2 or more and 4 or less carbons; x1 and x2 are average numbers of added moles, and each represent a number of 0 or more and 10 or less; and M is a cationic ion.

<61>

The method for treating a target object according to <60>, wherein, in the presence of water, component (A) is brought into contact with the target object, and further, a treatment liquid containing component (A) and water is brought into contact with the target object.

<62>

The method for treating a target object according to <60> or <61>, wherein the target object is treated with a treatment liquid containing component (A) and water.

<63>

The method for treating a target object according to <62>, wherein the treatment liquid is obtained by mixing the lubricating agent according to any of <1> to <37> or the lubricating agent composition according to any of <38> to <51> with water.

<64>

The method for treating a target object according to <62> or <63>, wherein a method for bringing the treatment liquid into contact with the target object is a method of immersing the target object in the treatment liquid, a method of sprinkling the treatment liquid on the target object or a method of bringing the treatment liquid into contact with the target object by spraying or applying.

<65>

The method for treating a target object according to any of <62> to <64>, wherein the treatment liquid contains component (A) in an amount of 0.0001 mass % or more, 0.001 mass % or more, further 0.002 mass % or more, further 0.01 mass % or more, further 0.02 mass % or more, further 0.1 mass % or more and further 0.2 mass % or more, and 20 mass % or less, further 10 mass % or less, further 5 mass % and further 1 mass % or less.

<66>

The method for treating a target object according to any of <60> to <65>, wherein component (A) is used by mixing with water having a hardness of 0°DH or more and 30°DH or less, and further, the target object such as a fiber, a hard article or the like is treated with a treatment liquid obtained by mixing component (A) with water having a hardness of 0°DH or more and 30°DH or less.

<67>

The method for treating a target object according to <66>, wherein the hardness of the water mixed with component (A) is 1°DH or more, further 2°DH or more and further 3°DH or more, and 25°DH or less and further 20°DH or less.

<68>

The method for treating a target object according to any of <62> to <67>, wherein the treatment liquid has a hardness of 0°DH or more, further 1°DH or more, further 2°DH or more and further 3°DH or more, and 30°DH or less, further 25°DH or less and further 20°DH or less.

<69>

The method for treating a target object according to any of <60> to <68>, wherein the target object is one or more selected from a fiber and a hard article.

<70>

The method for treating a target object according to any of <60> to <69>, wherein (B) a surfactant [excluding component (A)] is further adhered to the target object together with component (A) and water.

<71>

The method for treating a target object according to <70>, wherein a mass ratio between the use amount of component (A) and the use amount of component (B), (B)/(A), is 10 or less, further 3 or less, further 2 or less, further 1.5 or less, further 1 or less, further 0.80 or less, further 0.70 or less and further 0.67 or less, and 0.001 or more, further 0.01 or more, further 0.1 or more and further 0.5 or more.

<72>

The method for treating a target object according to <70> or <71>, wherein the lubricating agent composition according to any of <40> to <43> is used.

<73>

The method for treating a target object according to any of <60> to <72>, wherein the lubricating agent according to any of <1> to <37> or the lubricating agent composition according to any of <38> to <51> is used.

<74>

The method for treating a target object according to any of <60> to <73>, wherein the target object is a fiber, and component (A) is used in an amount of preferably 0.01% o.w.f. or more, more preferably 0.03% o.w.f. or more, further preferably 0.05% o.w.f. or more, furthermore preferably 0.1% o.w.f. or more, furthermore preferably 0.2% o.w.f. or more and furthermore preferably 0.3% o.w.f. or more, and preferably 5% o.w.f. or less, more preferably 4% o.w.f. or less, further preferably 3% o.w.f. or less and furthermore preferably 2% o.w.f. or less relative to the fiber.

<75>

The method for treating a target object according to any of <60> to <73>, wherein the target object is a hard article, and a treatment liquid containing component (A) and water is used, wherein the content of component (A) is preferably 1 ppm or more, more preferably 2 ppm or more, further preferably 5 ppm or more and furthermore preferably 10 ppm or more, and preferably 5000 ppm or less, more preferably 2000 ppm or less and further preferably 1000 ppm or less.

<76>

The method for treating a target object according to any of <60> to <73> and <75>, wherein the target object is a hard article, and the treating amount of component (A) per surface area of the target object is preferably 2.7 μg/cm² or more, more preferably 5.4 μg/cm² or more, further preferably 13.6 μg/cm² or more and furthermore preferably 27.1 μg/cm² or more, and preferably 13600 μg/cm² or less, more preferably 5420 μg/cm² or less and further preferably 2710 μg/cm² or less.

<77>

The method for treating a target object according to any of <60> to <76>, wherein the method is a treatment method for forming a wet lubricant including, applying component (A) to the target object, for example, a fiber and/or a hard article, in water.

<78>

The method for treating a target object according to any of <60> to <76>, wherein the method is a treatment method for promoting dehydration including, applying component (A) to the target object, for example, a fiber and/or a hard article, in water.

<79>

The method for treating a target object according to any of <60> to <76>, wherein the method is a treatment method for promoting drying including, applying component (A) to the target object, for example, a fiber and/or a hard article, in water.

<80>

The method for treating a target object according to any of <60> to <76>, wherein the method is a treatment method for reducing friction including, applying component (A) to the target object, for example, a fiber and/or a hard article, in water.

<81>

The method for treating a target object according to any of <60> to <76>, wherein the method is a treatment method for enhancing dewaterability including, applying component (A) to the target object, for example, a fiber and/or a hard article, in water.

<82>

The method for treating a target object according to any of <60> to <75>, wherein the method is a treatment method for inhibiting entanglement during washing including, applying component (A) to the target object, for example, a fiber, in water.

<83>

A method for promoting dehydration during washing including, applying component (A) to washing in water, and thereafter dehydrating the washing, wherein component (A) may be applied to the washing, for example, during washing and/or during rinsing.

<84>

A method for forming a liquid sliding surface and further a method for forming a liquid sliding surface on a textile product and/or a hard article including, applying component (A) to a target object, for example, the textile product and/or the hard article, in water.

<85>

A method for enhancing dewaterability and further a method for enhancing dewaterability of a textile product and/or a hard article including, applying component (A) to a target object, for example, the textile product and/or the hard article, in water.

<86>

A surface modifying method including, applying component (A) to a target object, for example, a textile product and/or a hard article, in water.

<87>

A method for imparting hydrophilicity and further a method for imparting hydrophilicity to a textile product and/or a hard article including, applying component (A) to a target object, for example, the textile product and/or the hard article, in water.

<88>

A method for ensuring a uniform surface state of a target object and further a method for ensuring a uniform surface state of a textile product and/or a hard article including, applying component (A) to the target object, for example, the textile product and/or the hard article, in water.

<89>

A method for treating a target object including, adhering component (A) and water to the target object to form a liquid sliding surface against water on the target object, and sliding water coming in contact with the liquid sliding surface over the liquid sliding surface to separate the water from the target object.

<90>

Use of component (A) to form a lubricating surface against water on a target object.

EXAMPLES

<Lubricity evaluation 1>

A textile product was treated with a water bath using each of the following lubricating agents 1 to 3 and comparative lubricating agent 1, and the water content after dehydration was measured by the method described later and used as an indicator of lubricity (liquid sliding ability against water) impartation.

Lubricating agent 1: sodium bis-(2-propylheptyl) sulfosuccinate

Lubricating agent 2: sodium bis-(2-butyloctyl) sulfosuccinate

Lubricating agent 3: a sodium dialkyl sulfosuccinate obtained by sulfonating a maleic acid diester obtained by using the raw materials of isodecyl alcohol (manufactured by KH Neochem Co., Ltd., decanol) and maleic anhydride Comparative lubricating agent 1: dioctadecyl ammonium chloride (1) Pretreatment of Towel for Evaluation Towels treated beforehand in the following manner to remove starching agents and impurities were used for evaluation.

With a fully automatic washing machine (manufactured by Panasonic Corporation, model number: NA-F60PB3), a series of steps of a washing process (the water amount 50 L, washing for 10 minutes->tub rinsing twice->dehydration for 9 minutes) was repeated three times on 24 commercial cotton towels (manufactured by Yoshikawa Towel Co., Ltd., TW220, white) by adding 52.22 g of a 10% diluted solution of a nonionic surfactant (manufactured by Kao Corporation, EMULGEN 108) as a detergent and using Wakayama city tap water as water. Subsequently, the series of steps of the washing process was repeated twice with water alone. After that, the towels were left at a room temperature (25° C.) for 24 hours and thus naturally dried.

(2) Method for Treating Towel

In a portable washing machine (manufactured in the name of National, model number: NA-35), a predetermined amount of ion exchange water (bath ratio 25 kilograms per kilogram of the towels) was placed, and an aqueous calcium chloride solution (equivalent to 4000°DH) was added such that a treatment liquid to be obtained had any hardness shown in Table 1, and while stirring the mixture, a 5 mass % water dispersion of any of the lubricating agents shown in Table 1 was added such that the treating amount was as shown in Table 1 and stirred for 1 minute to prepare the treatment liquid, in which three of the cotton towels pretreated in the above (1) (about 210 g in total) were thereafter placed and treated for 5 minutes under stirring.

(3) Measurement of the Water Content after Dehydration

The three cotton towels treated in (2) were dehydrated for 5 minutes in a dehydration tub of a twin tub washing machine (manufactured by TOSHIBA CORPORATION, model number: VH-52G (H)), and the water content after dehydration was measured. The results are shown in Table 1.

TABLE 1

| | Example 1-1 | | | Example 1-2 | | | Example 1-3 | | | Example 1-4 | | | Example 1-5 | | | Example 1-6 | | | Comparative example 1-1 | | | Comparative example 1-2 | | | Comparative example 1-3 | | |
|---|---|---|---|---|---|---|---|---|---|---|---|---|---|---|---|---|---|---|---|---|---|---|---|---|---|---|---|
| | a | b | c | a | b | c | a | b | c | a | b | c | a | b | c | a | b | c | a | b | c | a | b | c | a | b | c |
| Lubricating agent Type | Lubricating agent 1 | | | Lubricating agent 1 | | | Lubricating agent 2 | | | Lubricating agent 2 | | | Lubricating agent 3 | | | Lubricating agent 3 | | | — | | | Comparative lubricating agent 1 | | | Comparative lubricating agent 1 | | |
| Treating amount [% o.w.f.] | 0.1 | | | 0.3 | | | 0.1 | | | 0.3 | | | 0.1 | | | 0.3 | | | — | | | 0.1 | | | 0.3 | | |
| Hardness of treatment liquid [° DH] | 0 | 4 | 20 | 0 | 4 | 20 | 0 | 4 | 20 | 0 | 4 | 20 | 0 | 4 | 20 | 0 | 4 | 20 | 0 | 4 | 20 | 0 | 4 | 20 | 0 | 4 | 20 |
| Water content after dehydration [mass %] | 49 | 46 | 46 | 49 | 47 | 47 | 56 | 54 | 48 | 52 | 49 | 47 | 54 | 53 | 51 | 52 | 53 | 52 | 62 | 60 | 60 | 56 | 58 | 59 | 53 | 57 | 57 |
| Dehydration promoting rate | 21% | 23% | 23% | 21% | 22% | 22% | 10% | 10% | 20% | 16% | 18% | 22% | 13% | 12% | 15% | 16% | 12% | 13% | — | — | — | 10% | 3% | 2% | 15% | 5% | 5% |

It is understood that the water content after dehydration can be reduced in examples 1-1 to 1-4 in which the lubricating agent of the present invention was used. Particularly, in examples 1-1 and 1-2, the dehydration promoting rate is 20% or more at any hardness, which indicates excellent lubricity against water and less susceptibility to the hardness of water.

Note that the dehydration promoting rate (%) is calculated by the following formula from the water content W after the treatment with any of the treatment liquids having a predetermined hardness and dehydration and the water content $W_0$ after the treatment with a treatment liquid having the same hardness and with no lubricating agents and dehydration. In the present example, $W_0$ is selected from any of a, b and c of comparative example 1-1.

Dehydration Promoting Rate (%)=100×[$W_0$−$W$]/$W_0$

From the results in Table 1, the lubricating agent of the present invention is judged to be more effective in promoting the separation of water during dehydration than the lubricating agent used in comparative examples.

(4) Measurement 2 of the Water Content after Dehydration

The three cotton towels treated in (2) were dehydrated for 2 minutes in the dehydration tub of the twin tub washing machine (manufactured by TOSHIBA CORPORATION, model number: VH-52G (H)), and the water content after dehydration was measured to calculate the dehydration promoting rate in the same manner as described above. In the present example, $W_0$ in the calculation formula of the dehydration promoting rate is selected from any of a, b and c of comparative example 2-1. The results are shown in Table 2.

used such that the total amounts of components (A) and (B) were the treating amounts in Tables 3a and 3b (provided that, for comparative examples 3-9 and 3-10, the amount of PG is shown in parentheses). Further, the water content was measured by the method in the above (3) after dehydration for 5 minutes and by the method in the above (4) after dehydration for 2 minutes. Further, the dehydration enhancing rates (%) were calculated by the following formula, where W represents the water content after the treatment with any of the treatment liquids having a predetermined hardness and dehydration, and $W_B$ represents the water content after the treatment with the treatment liquid having the same hardness obtained from the reference composition containing the same component (B) as that contained in the composition for which W was evaluated and dehydration. Note that the dehydration enhancing rates were not calculated for the compositions not containing component (B).

Dehydration enhancing rate (%)=100×[$W_B$−$W$]/$W_B$

<Component (B)>

B-1: sodium internal olefin sulfonate with 18 carbons

B-2: sodium dodecyl benzene sulfonate

B-3: a sodium polyoxyethylene/polyoxypropylene lauryl ether sulfate (a compound with an average number of added moles of ethylene oxide of 1.5 and an average number of added moles of propylene oxide of 0.4 in which the polyoxyethylene group and the polyoxypropylene group are bonded to the lauryl group in blocks in this order)

TABLE 2

|  |  | Example 2-1 | | | Example 2-2 | | | Comparative example 2-1 | | |
| --- | --- | --- | --- | --- | --- | --- | --- | --- | --- | --- |
|  |  | Test number | | | | | | | | |
|  |  | a | b | c | a | b | c | a | b | c |
| Lubricating agent | Type | Lubricating agent 1 | | | Lubricating agent 3 | | | — | | |
|  | Treating amount [% o.w.f.] | 0.3 | | | 0.3 | | | — | | |
| Hardness of treatment liquid [° DH] | | 0 | 4 | 20 | 0 | 4 | 20 | 0 | 4 | 20 |
| Water content after dehydration [mass %] | | 59 | 58 | 57 | 58 | 59 | 57 | 67 | 66 | 66 |
| Dehydration promoting rate | | 12% | 12% | 14% | 13% | 11% | 14% | — | | |

It is understood that the water content after dehydration can be reduced in examples 2-1 to 2-2 in which the lubricating agent of the present invention was used. Even with dehydration shorter than usual for 2 minutes, the dehydration promoting rate is 10% or more at any hardness, which indicates excellent lubricity against water and less susceptibility to the hardness.

The lubricating agent compositions in Tables 3a and 3b were prepared by using lubricating agent 1 and the components listed below, and the textile product was treated with a water bath using each of them and the water content after dehydration was measured in the same manner as in example 1 or the like and used as an indicator of lubricity impartation. In the treatment of towels in the above (2) in the present example, the lubricating agent compositions were B-4: sodium lauryl sulfate B-5: sodium myristyl sulfate B-6: sodium palmityl sulfate B-7: a polyoxyethylene lauryl ether (with an average number of added moles of ethylene oxide of 6)

B-8: a polyoxyethylene lauryl ether (with an average number of added moles of ethylene oxide of 21)

B-9: a polyoxyethylene lauryl ether (with an average number of added moles of ethylene oxide of 4)

B-10: lauryl betaine, lauryl dimethyl aminoacetic acid betaine

B-11: 2-cocoyl-N-carboxymethyl-N-hydroxyethyl imidazolinium betaine

<Other Components>

BDG: butyl diglycol

PG: propylene glycol

TABLE 3a

| | | | Example | | | | | | | | | | | | | | | |
|---|---|---|---|---|---|---|---|---|---|---|---|---|---|---|---|---|---|---|
| | | | 3-1 | 3-2 | 3-3 | 3-4 | 3-5 | 3-6 | 3-7 | 3-8 | 3-9 | 3-10 | 3-11 | 3-12 | 3-13 | 3-14 | 3-15 | 3-16 | 3-17 |
| Lubricating agent composition | Formulation component (mass %) | (A) Lubricating agent 1 | 7.7 | 6.5 | 7.7 | 7.7 | 7.7 | 8.7 | 1.7 | 2.5 | 3 | 7.7 | 7.7 | 7.6 | 8.1 | 2.3 | 2.5 | 13.0 | 13.0 |
| | | (B) B-1 | 7.7 | | 7.7 | 7.7 | 7.7 | | 3.3 | | | | | | | | | | |
| | | B-2 | | 9.8 | | | | 5.8 | | 2.5 | 2 | | | | | | | | |
| | | B-3 | | | | | | | | | | 7.7 | | | | | | | |
| | | B-7 | | | | | | | | | | | 7.7 | | | | | | |
| | | B-8 | | | | | | | | | | | | 7.6 | | | | | |
| | | B-10 | | | | | | | | | | | | | 8.1 | | | | |
| | | B-11 | | | | | | | | | | | | | | 2.3 | 2.5 | | |
| | BDG | | 1.9 | | | | | | | | | | | | | | | | |
| | PG | | 30.9 | 30.9 | 30.9 | 30.9 | 30.9 | 30.9 | | | | 30.9 | 30.9 | 31.5 | 27.2 | | | 44.2 | 44.2 |
| | Water | | Balance | Balance | Balance | Balance | Balance | Balance | Balance | Balance | Balance | Balance | Balance | Balance | Balance | Balance | Balance | Balance | Balance |
| | Total | | 100 | 100 | 100 | 100 | 100 | 100 | 100 | 100 | 100 | 100 | 100 | 100 | 100 | 100 | 100 | 100 | 100 |
| (B)/(A) (mass ratio) | | | 1 | 1.5 | 1 | 1 | 1 | 0.67 | 2 | 1 | 0.67 | 1 | 1 | 1 | 1 | 1 | 1 | 0 | 0 |
| Treating amount [% o.w.f.] | | | 0.3 | 0.3 | 0.1 | 0.2 | 0.3 | 0.3 | 0.3 | 0.3 | 0.3 | 0.3 | 0.3 | 0.3 | 0.3 | 0.3 | 0.3 | 0.3 | 0.3 |
| Hardness of treatment liquid [° DH] | | | 4 | 4 | 4 | 4 | 4 | 4 | 4 | 4 | 4 | 4 | 20 | 4 | 4 | 4 | 4 | 4 | 20 |
| Dehydration for 2 minutes | Water content after dehydration [mass %] | | 59 | 63 | 67 | 64 | 62 | 61 | 66 | 63 | 63 | 60 | 59 | 61 | 63 | 67 | 66 | 59 | 60 |
| | Dehydration enhancing rate [%] | | 8 | 7 | 1 | 6 | 9 | 10 | 3 | 7 | 7 | 12 | 12 | 10 | 10 | 0 | 6 | — | — |
| Dehydration for 5 minutes | Water content after dehydration [mass %] | | 54 | 55 | 59 | 55 | 53 | 54 | 57 | 55 | 54 | 54 | 52 | 55 | 56 | 59 | 58 | 53 | 53 |
| | Dehydration enhancing rate [%] | | 0 | 5 | 0 | 5 | 9 | 7 | 2 | 5 | 7 | 10 | 9 | 5 | 11 | 2 | 3 | — | — |

TABLE 3b

| | | | Comparative example | | | | | | | | | | | |
|---|---|---|---|---|---|---|---|---|---|---|---|---|---|---|
| | | | 3-1 | 3-2 | 3-3 | 3-4 | 3-5 | 3-6 | 3-7 | 3-8 | 3-9 | 3-10 | 3-11 | 3-12 |
| Lubricating agent composition (mass %) | Formulation component | (A) Lubricating agent 1 | 20 | | | | | | | | | | | |
| | (B) | B-1 | | 20 | | | | | | | | | | |
| | | B-2 | | | 20 | | | | | | | | | |
| | | B-3 | | | | 20 | | | | | | | | |
| | | B-7 | | | | | 20 | | | | | | | |
| | | B-8 | | | | | | 19.6 | | | | | | |
| | | B-10 | | | | | | | 31 | | | | | |
| | | B-11 | | | | | | | | 40 | | | | |
| | | BDG | 5.0 | | | | | | | | | | | |
| | | PG | 10 | 10 | 10 | 10 | 10 | 11.8 | | | | | | |
| | | Water | Balance | Balance | Balance | Balance | Balance | Balance | Balance | Balance | | | | |
| | Total | | 100 | 100 | 100 | 100 | 100 | 100 | 100 | 100 | 100 | 100 | 100 | 100 |
| | (B)/(A) (mass ratio) | | — | — | — | — | — | — | — | — | — | — | — | — |
| Treating amount [% o.w.f.] | | | 0.3 | 0.3 | 0.3 | 0.3 | 0.3 | 0.3 | 0.3 | 0.3 | (2.0) | (2.0) | — | — |
| Hardness of treatment liquid [° DH] | | | 4 | 4 | 4 | 20 | 4 | 4 | 4 | 4 | 4 | 20 | 4 | 20 |
| Dehydration for 2 minutes | Water content after dehydration [mass %] | | 64 | 68 | 68 | 67 | 68 | 70 | 67 | 70 | 67 | 66 | 67 | 68 |
| | Dehydration enhancing rate [%] | | (Reference) | (Reference) | (Reference) | (Reference) | (Reference) | (Reference) | (Reference) | (Reference) | — | — | — | — |
| Dehydration for 5 minutes | Water content after dehydration [mass %] | | 54 | 58 | 60 | 57 | 58 | 63 | 60 | 60 | 60 | 60 | 62 | 58 |
| | Dehydration enhancing rate [%] | | (Reference) | (Reference) | (Reference) | (Reference) | (Reference) | (Reference) | (Reference) | (Reference) | — | — | — | — |

It is understood that the water contents after dehydration can be reduced in examples 3-1 to 3-17 in which the lubricating agent of the present invention was used. The dehydration rates are enhanced with any component (B), and particularly, the results of examples 3-2 and 3-9 show less susceptibility to the mass ratio (B)/(A).

<Lubricity Evaluation 2>

Treatment liquids were prepared by the method described later and each substrate was treated with certain treatment liquids prepared, and the dynamic contact angle of water was measured on the treated substrate and used as an indicator of lubricity (the ability to form a liquid sliding surface against water). The lubricating agents and component (B) used in the present evaluation are the same as those used in lubricity evaluation 1. Further, the following substrates 1 to 4 with a size of 1.0 mm×25 mm×70 mm and substrate 5 with a size of 2.0 mm×10 mm×70 mm were used.

Substrate 1: a polypropylene substrate (Standard Test Piece, Inc., PP-N-AN)
Substrate 2: a polyethylene terephthalate substrate (Standard Test Piece, Inc., SUNLOID PET PIECE)
Substrate 3: a glass substrate (Matsunami Glass Ind., Ltd., S2112)
Substrate 4: a SUS substrate (Standard Test Piece, Inc., SUS430)
Substrate 5: a chloroprene rubber substrate (Nippon Testpanel Co., Ltd., CR)

(1) Preparation of Treatment Liquid

Any lubricating agent and as necessary any component (B) shown in Tables 4 to 9 were mixed with water having a predetermined hardness at any treating concentrations shown in the tables, thereby preparing each of the treatment liquids having any hardness shown in the tables.

(2) Washing of Substrate

Each substrate shown in Tables 4 to 8 was immersed in 300 mL of a washing liquid (manufactured by FUJIFILM Wako Pure Chemical Corporation in which Contaminon® L was used at a concentration of 2%) and subjected to an ultrasonic treatment for 15 minutes. The substrate was rinsed with 25 mL of ion exchange water, and thereafter immersed in ethanol and subjected to an ultrasonic treatment for 30 minutes. The substrate was rinsed with 25 mL of ion exchange water and thereafter dried by being left to stand overnight (for 12 hours) under an environment at a humidity of 40 to 50% RH, and used as an untreated substrate. Note that the model number UT-604 manufactured by SHARP CORPORATION was used for the ultrasonic treatment.

(3) Treatment of Substrate 100 mL of the treatment liquid prepared in (1) was placed in a PP wide-mouth bottle (manufactured by AS ONE Corporation, product number 100 mL), in which the untreated substrate washed in (2) was immersed and treated for 15 minutes at 25° C. while shaken with the model number BR-21FH manufactured by TAITEC CORPORATION at 200 rpm. After that, the substrate was immersed in 100 mL of water having the same hardness as that of the treatment liquid for 30 seconds, and thereafter dried by being left to stand overnight (for 12 hours) under the conditions of a temperature of 23° C. and a humidity of 40 to 50%.

(4) Method for Measuring Dynamic Contact Angle

With a fully automatic contact angle meter (manufactured by Kyowa Interface Science Co., Ltd., DropMaster), 4 μL of ion exchange water was added dropwise to each substrate and the inclination was started 10 seconds later, and increasing the angle of inclination at a rate of 2°/s, the angle of inclination and the contact angle were measured by a slip-down method to determine the roll-off angle and the contact angle hysteresis. The results are shown in each table. Note that the angle of inclination at which the droplet begins to slip down is referred to as the roll-off angle [° ]. Further, the difference between the advancing contact angle and the receding contact angle at the start of rolling off is referred to as the contact angle hysteresis [° ]. The roll-off angle shown in each table is the additive average of three roll-off angle measurements taken at three different locations on each substrate. The contact angle hysteresis shown in each table is the additive average of three contact angle hysteresis measurements corresponding to the roll-off angle measurements at the three locations.

TABLE 4

| | | Example | | | | | | | |
|---|---|---|---|---|---|---|---|---|---|
| | | 4-1 | 4-2 | 4-3 | 4-4 | 4-5 | 4-6 | 4-7 | 4-8 |
| Lubricating agent | Type | Lubricating agent 1 | Lubricating agent 1 | Lubricating agent 1 | Lubricating agent 1 | Lubricating agent 1 | Lubricating agent 1 | Lubricating agent 1 | Lubricating agent 1 |
| | Treating concentration (ppm) | 120 | 60 | 96 | 500 | 1000 | 60 | 96 | 120 |
| Hardness of treatment liquid [° DH] | | 4 | 4 | 4 | 4 | 4 | 20 | 20 | 20 |
| Roll-off angle [°] | Substrate 1 | 37 | 57 | 38 | 40 | 35 | 37 | 41 | 35 |
| | Substrate 2 | 33 | 58 | 52 | 27 | 19 | 29 | 31 | 26 |
| | Substrate 3 | 27 | 13 | 16 | 11 | 28 | 8 | 24 | 22 |
| | Substrate 4 | 35 | 38 | 36 | 34 | 31 | 36 | 32 | 34 |
| | Substrate 5 | — | — | — | — | — | 43 | 55 | 51 |
| Contact angle hysteresis [°] | Substrate 1 | 29 | — | 25 | 27 | — | 26 | 27 | 27 |
| | Substrate 2 | 24 | 36 | 35 | 23 | 13 | 26 | 30 | 18 |
| | Substrate 3 | 19 | 9 | 17 | 8 | 16 | 13 | 16 | 12 |
| | Substrate 4 | 29 | 25 | 27 | 25 | 23 | 26 | 20 | 23 |
| | Substrate 5 | — | — | — | — | — | 32 | 31 | 29 |

TABLE 4-continued

|  |  |  | Example | | Comparative example | |
|---|---|---|---|---|---|---|
|  |  |  | 4-9 | 4-10 | 4-1 | 4-2 |
| Lubricating agent | Type | | Lubricating agent 1 | Lubricating agent 1 | — | — |
|  | Treating concentration (ppm) | | 500 | 1000 | — | — |
| Hardness of treatment liquid [° DH] | | | 20 | 20 | 4 | 20 |
| Roll-off angle [°] | Substrate 1 | | 32 | 29 | >80 | >80 |
|  | Substrate 2 | | 27 | 23 | >80 | >80 |
|  | Substrate 3 | | 22 | 28 | >80 | >80 |
|  | Substrate 4 | | 36 | 35 | >80 | >80 |
|  | Substrate 5 | | 42 | 36 | >80 | >80 |
| Contact angle hysteresis [°] | Substrate 1 | | 32 | 22 | — | — |
|  | Substrate 2 | | 24 | 18 | — | — |
|  | Substrate 3 | | 16 | 22 | — | — |
|  | Substrate 4 | | 25 | 21 | — | — |
|  | Substrate 5 | | 27 | 21 | — | — |

It is understood that lubricity against water can be imparted to the target surfaces in examples 4-1 to 4-10 in which the surfaces were treated with the lubricating agent of the present invention. The excellent lubricity against water on any target surface in the examples indicates less susceptibility to the type of target surface. Note that ">80" in the tables means "more than 80" (the same applies hereinafter).

TABLE 5

|  |  | Example | | | | | |
|---|---|---|---|---|---|---|---|
|  |  | 5-1 | 5-2 | 5-3 | 5-4 | 5-5 | 5-6 |
| Lubricating agent | Type | Lubricating agent 1 | Lubricating agent 1 | Lubricating agent 1 | Lubricating agent 1 | Lubricating agent 1 | Lubricating agent 1 |
|  | Treating concentration (ppm) | 120 | 120 | 120 | 120 | 60 | 60 |
| Hardness of treatment liquid [° DH] | | 4 | 8 | 12 | 20 | 1 | 2 |
| Roll-off angle [°] | Substrate 2 | 33 | 41 | 30 | 26 | 52 | 59 |
| Contact angle hysteresis [°] | Substrate 2 | 24 | 32 | 28 | 18 | 34 | 37 |

|  |  | Example | | | |
|---|---|---|---|---|---|
|  |  | 5-7 | 5-8 | 5-9 | 5-10 |
| Lubricating agent | Type | Lubricating agent 1 | Lubricating agent 1 | Lubricating agent 1 | Lubricating agent 1 |
|  | Treating concentration (ppm) | 60 | 60 | 60 | 60 |
| Hardness of treatment liquid [° DH] | | 4 | 8 | 12 | 20 |
| Roll-off angle [°] | Substrate 2 | 58 | 41 | 44 | 29 |
| Contact angle hysteresis [°] | Substrate 2 | 36 | 33 | 34 | 26 |

It is understood that the liquid sliding ability against water can be imparted to the target surface in examples 5-1 to 5-10 in which the surface was treated with the lubricating agent of the present invention. The excellent lubricity against water at any hardness in the examples indicates less susceptibility to the hardness.

TABLE 6

| | | | | Example | | | | | | | Comparative example | | | | | | |
|---|---|---|---|---|---|---|---|---|---|---|---|---|---|---|---|---|---|
| | | | | 6-1 | 6-2 | 6-3 | 6-4 | 6-5 | 6-6 | 6-7 | 6-1 | 6-2 | 6-3 | 6-4 | 6-5 | 6-6 | 6-7 |
| Treatment liquid | Treating concentration (ppm) | (A) | Lubricating agent 1 | 120 | 96 | 96 | 96 | 96 | 96 | 96 | | | | | | | |
| | | (B) | B-2 | | 24 | | | | | | | 120 | | | | | |
| | | | B-4 | | | 24 | | | | | | | 120 | | | | |
| | | | B-5 | | | | 24 | | | | | | | 120 | | | |
| | | | B-6 | | | | | 24 | | | | | | | 120 | | |
| | | | B-9 | | | | | | 24 | | | | | | | 120 | |
| | | | B-7 | | | | | | | 24 | | | | | | | 120 |
| | | | Total of (A) and (B) | 120 | 120 | 120 | 120 | 120 | 120 | 120 | 0 | 120 | 120 | 120 | 120 | 120 | 120 |
| | | | Hardness of treatment liquid [° DH] | 4 | 4 | 4 | 4 | 4 | 4 | 4 | 4 | 4 | 4 | 4 | 4 | 4 | 4 |
| Roll-off angle [°] | | | Substrate 1 | 37 | 57 | 36 | 38 | — | 35 | 36 | >80 | >80 | >80 | >80 | >80 | >80 | >80 |
| | | | Substrate 2 | 33 | 42 | 47 | 28 | 40 | 26 | 23 | >80 | >80 | >80 | >80 | >80 | >80 | >80 |
| Contact angle hysteresis [°] | | | Substrate 1 | 29 | — | 25 | 34 | — | 28 | 17 | — | — | — | — | — | — | — |
| | | | Substrate 2 | 24 | 28 | 33 | 23 | 29 | 18 | 11 | — | — | — | — | — | — | — |

It is understood that lubricity against water can be imparted to the target surfaces in examples 6-1 to 6-7 in which the surfaces were treated with the lubricating agent of the present invention. It is understood from the results of examples 6-2 to 6-7 that the combined use of components (A) and (B) does not inhibit the lubricity against water of component (A).

TABLE 7

| | | | | Example | | | | | | | Comparative example |
|---|---|---|---|---|---|---|---|---|---|---|---|
| | | | | 7-1 | 7-2 | 7-3 | 7-4 | 7-5 | 7-6 | 7-7 | 7-1 |
| Treatment liquid | Treating concentration (ppm) | (A) | Lubricating agent 1 | 120 | 96 | 96 | 96 | 96 | 96 | 96 | |
| | | (B) | B-2 | | 24 | | | | | | |
| | | | B-4 | | | 24 | | | | | |
| | | | B-5 | | | | 24 | | | | |
| | | | B-6 | | | | | 24 | | | |
| | | | B-9 | | | | | | 24 | | |
| | | | B-7 | | | | | | | 24 | |
| | | | Total of (A) and (B) | 120 | 120 | 120 | 120 | 120 | 120 | 120 | 0 |
| | | | Hardness of treatment liquid [° DH] | 20 | 20 | 20 | 20 | 20 | 20 | 20 | 20 |
| Roll-off angle [°] | | | Substrate 1 | 35 | 51 | 47 | 54 | 49 | 24 | 56 | >80 |
| | | | Substrate 2 | 26 | 33 | 39 | 43 | 44 | 20 | 22 | >80 |
| Contact angle hysteresis [°] | | | Substrate 1 | 27 | 16 | 32 | — | 8 | 16 | — | — |
| | | | Substrate 2 | 18 | 21 | 29 | 30 | 30 | 17 | 18 | — |

It is understood that lubricity against water can be imparted to the target surfaces in examples 7-1 to 7-7 in which the surfaces were treated with the lubricating agent of the present invention. It is understood from the results of examples 7-2 to 7-7 that the combined use of components (A) and (B) does not inhibit the lubricity against water of component (A).

TABLE 8

| | | Example | | | Comparative example | |
|---|---|---|---|---|---|---|
| | | 8-1 | 8-2 | 8-3 | 8-1 | 8-2 |
| Lubricating agent | Type | Lubricating agent 1 | Lubricating agent 3 | Lubricating agent 3 | — | — |
| | Treating concentration (ppm) | 120 | 120 | 120 | — | — |

TABLE 8-continued

|  |  | Example | | | Comparative example | |
| --- | --- | --- | --- | --- | --- | --- |
|  |  | 8-1 | 8-2 | 8-3 | 8-1 | 8-2 |
| Hardness of treatment liquid [° DH] | | 4 | 4 | 20 | 4 | 20 |
| Roll-off angle [°] | Substrate 1 | 37 | 61 | 27 | >80 | >80 |
| | Substrate 2 | 33 | 14 | 40 | >80 | >80 |
| | Substrate 3 | 27 | 11 | 27 | >80 | >80 |
| Contact angle hysteresis [°] | Substrate 1 | 29 | — | — | — | — |
| | Substrate 2 | 24 | 10 | 26 | — | — |
| | Substrate 3 | 19 | 10 | 23 | — | — |

It is understood that lubricity against water can be imparted to the target surfaces in examples 8-1 to 8-3 in which the surfaces were treated with the lubricating agent of the present invention. The excellent lubricity against water on any target surface indicates less susceptibility to the material of target surface.

TABLE 9

|  |  |  |  | Example | | | | | | | | | Comparative example | |
| --- | --- | --- | --- | --- | --- | --- | --- | --- | --- | --- | --- | --- | --- | --- |
|  |  |  |  | 9-1 | 9-2 | 9-3 | 9-4 | 9-5 | 9-6 | 9-7 | 9-8 | 9-9 | 10-1 | 10-2 |
| Treatment liquid | Treating concentration (ppm) | (A) | Lubricating agent 1 | 120 | 96 | 72 | 48 | 120 | 96 | 72 | 48 | 24 | | |
| | | (B) | B-7 | | 24 | 48 | 72 | | 24 | 48 | 72 | 96 | 120 | 120 |
| | | | Total of (A) and (B) | 120 | 120 | 120 | 120 | 120 | 120 | 120 | 120 | 120 | 120 | 120 |
| | Hardness of treatment liquid [° DH] | | | 4 | 4 | 4 | 4 | 20 | 20 | 20 | 20 | 20 | 4 | 20 |
| Static contact angle [°] | Substrate 2 | | | 22 | 14 | ND*[1] | ND*[1] | 24 | ND*[1] | ND*[1] | ND*[1] | ND*[1] | 45 | 58 |
| Roll-off angle [°] | Substrate 2 | | | 20 | 7 | ND*[2] | ND*[2] | 18 | ND*[2] | ND*[2] | ND*[2] | ND*[2] | >80 | >80 |
| Contact angle hysteresis [°] | Substrate 2 | | | 19 | 5 | ND*[3] | ND*[3] | 11 | ND*[3] | ND*[3] | ND*[3] | ND*[3] | — | — |

*[1] spread wetly to the extent that the static contact angle cannot be measured
*[2] spread wetly to the extent that the roll-off angle cannot be measured
*[3] the roll-off angle cannot be measured, and consequently, the hysteresis cannot be measured either It is understood that the target surface is highly hydrophilized and excellent in lubricity against water in examples 9-1 to 9-9 in which the surface was treated with the lubricating agent of the present invention.

<Dewaterability Evaluation>

Substrates 2 and 3 used in lubricity evaluation 2 were washed and treated in the same manner as in (2) and (3) in lubricity evaluation 2. Ion exchange water was sprayed with a sprayer to each substrate after the treatment, and the amount of water adhering to the substrate immediately after the spraying (initial adhesion amount) (g) and the amount of water adhering to the substrate 10 seconds later (residual amount) (g) were measured to evaluate the dewaterability on the basis of the discharge rate determined by the following formula from those amounts.

Discharge rate (%)=100×[1−(residual amount)/(initial adhesion amount)]

Note that a sprayer manufactured by Maruemu Corporation (300 mL in volume, No. 6) was pushed three times to spray ion exchange water to the substrate. Further, the residual amount and the initial adhesion amount were determined in the following manner.

(Residual amount)=(total mass of substrate 10 seconds later)−(mass of substrate before spraying)

(Initial adhesion amount)=(residual amount)+ (amount of water dropping off for 10 seconds)

TABLE 10

|  |  | Example | | Comparative example | |
| --- | --- | --- | --- | --- | --- |
|  |  | 10-1 | 10-2 | 10-1 | 10-2 |
| Lubricating agent | Type | Lubricating agent 1 | Lubricating agent 1 | — | — |
| | Treating concentration (ppm) | 120 | 120 | — | — |
| Hardness of treatment liquid [°DH] | | 4 | 20 | 4 | 20 |
| Dewaterability (discharge rate) [%] | Substrate 2 | 92 | 85 | 56 | 1 |
| | Substrate 3 | 87 | 96 | 52 | 30 |

It is understood that the dewaterability of each target surface can be enhanced in examples 10-1 to 10-2 in which the surfaces were treated with the lubricating agent of the present invention. The discharge rates of 80% or more on both target surfaces indicate less susceptibility to the material of target surface.

<Evaluation of Spotty Adsorptivity>

The pretreatment of towels, the treatment of towels with lubricating agents and dehydration were carried out in the same manner as in example 1-1 except that 24 towels were treated simultaneously under any conditions shown in Table 11. After dehydrated, the towels were naturally dried.

After drying, five towels were selected at random, from each of which five towel pieces with a size of 10 cm×10 cm were cut, and the amount of lubricating agent adsorbed to the cut fabric was determined in the following manner. The standard deviation of the adsorption amounts of a total of 25 towel pieces was determined. The standard deviation for 25 towel pieces is shown in Table 11.

(Measurement of Adsorption Amount)

80 mL of methanol was placed in a screw bottle manufactured by Maruemu Corporation (100 mL in volume, No. 8), in which the towel pieces were immersed and subjected to an ultrasonic treatment with the model number UT-604 manufactured by SHARP CORPORATION for 30 minutes. The obtained extracted liquid was appropriately diluted, and filtered with the disposable membrane filter unit DISMIC 13HP with a hole diameter of 0.2 μm manufactured by ADVANTEC CORPORATION, and thereafter subjected to LC/MS. Note that the model number LCMS-2020 manufactured by SHIMADZU CORPORATION was used for the LC/MS. The LC/MS was performed under the following conditions.

(Chromatography Separation)
- Column: UK-C18 HT manufactured by IMTAKT CORPORATION, 2 mm in inner diameter×50 mm in length, 3 μm in particle size
- Column temperature: 40° C.
- Eluent A: 10 mM ammonium acetate-containing water
- Eluent B: 10 mM ammonium acetate-containing methanol Flow rate: 0.3 mL/min
- Gradient: eluent B 0% (0 to 5 minutes)->100% (5 to 15 minutes)->100% (15 to 25 minutes)->0% (25.01 to 30 minutes)
- Injection volume: 1 μL (Mass Analysis)
Ionization method: electrospray ionization (ESI)
Analysis Mode:
- lubricating agent 1: negative, SIM (m/z=477.1)
- comparative lubricating agent 1: positive, SIM (m/z=550.6)

TABLE 11

|  |  | Test group I | | Test group II | |
| --- | --- | --- | --- | --- | --- |
|  |  | Example 11-1 | Comparative example 11-1 | Example 11-2 | Comparative example 11-2 |
| Lubricating agent | Type | Lubricating agent 1 | Comparative lubricating agent 1 | Lubricating agent 1 | Comparative lubricating agent 1 |
|  | Treating amount [% o.w.f.] | 0.1 | 0.1 | 0.3 | 0.3 |
|  | Hardness of treatment liquid [°DH] | 4 | 4 | 4 | 4 |
| Spotty adsorption evaluation | Standard deviation of adsorption amounts | 33.7 | 39.9 | 12.0 | 18.5 |

In examples 11-1 and 11-2 in which towels were treated with the lubricating agent of the present invention, the maximum values of the standard deviation for the towels are smaller compared with those in comparative examples 11-1 and 11-2, respectively, indicating that spotty adsorption occurs less.

The invention claimed is:

1. A method comprising:
adhering (A) a compound represented by the following formula 1 and water to a textile product to form a liquid sliding surface against water on the textile product,

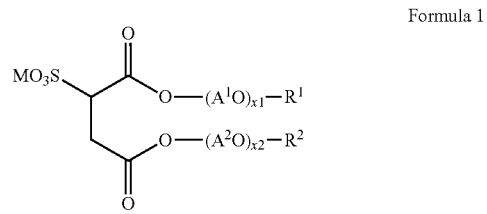

Formula 1 wherein:
$R^1$ and $R^2$ each represent a branched-chain alkyl group with 10 or more and 12 or less carbons;
$A^1O$ and $A^2O$ each represent an alkyleneoxy group with 2 or more and 4 or less carbons;
x1 and x2 are average numbers of added moles, and each represent a number of 0 or more and 10 or less; and
M is a cationic ion.

2. The method according to claim 1, wherein x1 and x2 in the formula 1 each represent 0.

3. The method according to claim 1, herein $R^1$ and $R^2$ in the formula 1 each represent a branched-chain alkyl group derived from a Guerbet alcohol with 10 or more and 12 or less carbons.

4. The method according to claim 1, wherein the textile product is treated with a treatment liquid comprising the compound represented by formula 1 and water.

5. The method according to claim 1, wherein the textile product comprises a cotton fiber.

6. The method according to claim 1, wherein (B) a surfactant, which is not a compound of formula 1, is further adhered to the textile product together with the compound represented by formula 1 and water.

7. The method according to claim 1, wherein the textile product comprises a fiber selected from natural fibers, synthetic fibers and semi-synthetic fibers.

8. The method according to claim 1, wherein the textile product comprises a hydrophobic fiber.

9. The method according to claim 1, wherein the textile product comprises a fiber selected from protein fibers, polyamide fibers, polyester fibers, polyacrylonitrile fibers, polyvinyl alcohol fibers, polyvinyl chloride fibers, polyvinylidene chloride fibers, polyolefin fibers, polyurethane fibers, polyvinyl chloride/polyvinyl alcohol copolymer fibers, polyalkylene paraoxybenzoate fibers, and polyfluoroethylene fibers.

10. The method according to claim 1, wherein the textile product comprises a hydrophilic fiber.

11. The method according to claim 1, wherein the textile product comprises a fiber selected from seed hair fibers, bast fibers, vein fibers, palm fibers, juncus, straw, aminal hair fibers, silk fibers, feathers, and cellulose fibers.

12. The method according to claim 1, wherein the textile product comprises at least 5 mass % cotton fiber.

13. The method according to claim 1, wherein the textile product comprises at least 10 mass % cotton fiber.

14. The method according to claim 1, wherein the textile product comprises at least 20 mass % cotton fiber.

15. The method according to claim 1, wherein the textile product comprises 100 mass % cotton fiber.

* * * * *